(12) United States Patent
Parker et al.

(10) Patent No.: US 8,462,292 B2
(45) Date of Patent: Jun. 11, 2013

(54) OPTICALLY TRANSMISSIVE SUBSTRATES AND LIGHT EMITTING ASSEMBLIES AND METHODS OF MAKING SAME, AND METHODS OF DISPLAYING IMAGES USING THE OPTICALLY TRANSMISSIVE SUBSTRATES AND LIGHT EMITTING ASSEMBLIES

(75) Inventors: Jeffery R. Parker, Richfield, OH (US); Timothy A. McCollum, Thurmont, MD (US); Fumitomi Hide, San Jose, CA (US)

(73) Assignee: Rambus Delaware LLC, Brecksville, OH (US)

( * ) Notice: Subject to any disclaimer, the term of this patent is extended or adjusted under 35 U.S.C. 154(b) by 750 days.

(21) Appl. No.: 12/504,236

(22) Filed: Jul. 16, 2009

(65) Prior Publication Data
US 2010/0026703 A1 Feb. 4, 2010

Related U.S. Application Data

(60) Provisional application No. 61/085,193, filed on Jul. 31, 2008.

(51) Int. Cl.
*G02F 1/1335* (2006.01)
*G02F 1/133* (2006.01)
*G09G 3/36* (2006.01)

(52) U.S. Cl.
USPC .................. 349/62; 349/61; 349/68; 349/73; 345/102; 362/616

(58) Field of Classification Search
USPC ........... 349/61–62, 68, 73; 345/102; 362/612, 362/616
See application file for complete search history.

(56) References Cited

U.S. PATENT DOCUMENTS 2,480,178 A 8/1949 Zinberg
2,831,453 A 4/1958 Hardesty
(Continued)

FOREIGN PATENT DOCUMENTS

CN 1842838 10/2006
CN 101082717 12/2007
(Continued)

OTHER PUBLICATIONS

International Search Report dated Nov. 12, 2009, Application No. PCT/US2009/051916 (enclosed).
(Continued)

*Primary Examiner* — Nathanael R Briggs
(74) *Attorney, Agent, or Firm* — Renner, Otto, Boisselle & Sklar, LLP

(57) ABSTRACT

Images are displayed in response to a video signal using a light emitting assembly having one or more optically transmissive substrates, films or sheets, each having at least one pattern of optical elements on or in the substrates, films or sheets. A plurality of light sources are configured to illuminate one or more output areas of one or more of the substrates, films or sheets. The light emitting assembly is configured to emit light through the pattern of optical elements and produce a predetermined luminance profile of the light emitting assembly. At least one of the light sources is dimmed or boosted in response to an input video signal while operating a liquid crystal display as a light valve to illuminate the liquid crystal display by the light emitting assembly. At least some adjacent substrates, films or sheets may have portions that overlap, and at least one pattern of optical elements on or in at least one side of the substrates, films or sheets may be configured so that discontinuities between the adjacent substrates, films or sheets are minimized. A predetermined light output from the light emitting assembly may be produced by varying the electrical input to at least some of the light sources.

16 Claims, 30 Drawing Sheets

U.S. PATENT DOCUMENTS

| | | |
|---|---|---|
| 3,043,947 A | 7/1962 | Albinger, Jr. |
| 3,049,616 A | 8/1962 | Davis |
| 3,070,913 A | 1/1963 | Miller |
| 3,241,256 A | 3/1966 | Viret et al. |
| 3,267,278 A | 8/1966 | Doolittle |
| 3,328,570 A | 6/1967 | Balchunas |
| 3,611,069 A | 10/1971 | Galginaitis et al. |
| 3,721,815 A | 3/1973 | Wall |
| 3,752,974 A | 8/1973 | Baker et al. |
| 3,760,179 A | 9/1973 | Addington, Jr. |
| 3,781,537 A | 12/1973 | Ramsey |
| 3,789,211 A | 1/1974 | Kramer |
| 3,875,456 A | 4/1975 | Kano et al. |
| 3,892,959 A | 7/1975 | Pulles |
| 3,958,113 A | 5/1976 | Termohlen |
| 4,043,636 A | 8/1977 | Eberhardt et al. |
| 4,128,332 A | 12/1978 | Rowe |
| 4,183,628 A | 1/1980 | Laesser et al. |
| 4,257,084 A | 3/1981 | Reynolds |
| 4,277,817 A | 7/1981 | Hehr |
| 4,323,951 A | 4/1982 | Pasco |
| 4,373,282 A | 2/1983 | Wragg |
| 4,446,508 A | 5/1984 | Kinzie |
| 4,487,481 A | 12/1984 | Suzawa |
| 4,519,017 A | 5/1985 | Daniel |
| 4,573,766 A | 3/1986 | Bournay, Jr. et al. |
| 4,618,216 A | 10/1986 | Suzawa |
| 4,630,895 A | 12/1986 | Abdala, Jr. et al. |
| 4,642,736 A | 2/1987 | Masuzawa et al. |
| 4,648,690 A | 3/1987 | Ohe |
| 4,677,531 A | 6/1987 | Szeles |
| 4,714,983 A | 12/1987 | Lang |
| 4,729,067 A | 3/1988 | Ohe |
| 4,729,068 A | 3/1988 | Ohe |
| 4,729,185 A | 3/1988 | Baba |
| 4,751,615 A | 6/1988 | Abrams |
| 4,761,047 A | 8/1988 | Mori |
| 4,763,984 A | 8/1988 | Awai et al. |
| 4,765,701 A | 8/1988 | Cheslak |
| 4,791,540 A | 12/1988 | Dreyer, Jr. et al. |
| 4,802,066 A | 1/1989 | Mori |
| 4,811,507 A | 3/1989 | Blanchet |
| 4,825,341 A | 4/1989 | Awai |
| 4,890,201 A | 12/1989 | Toft |
| 4,909,604 A | 3/1990 | Kobayashi et al. |
| 4,914,553 A | 4/1990 | Hamada et al. |
| 4,929,062 A | 5/1990 | Guzik et al. |
| 4,947,291 A | 8/1990 | McDermott |
| 4,974,122 A | 11/1990 | Shaw |
| 4,975,808 A | 12/1990 | Bond et al. |
| 4,978,952 A | 12/1990 | Irwin |
| 4,985,809 A | 1/1991 | Matsui et al. |
| 4,992,704 A | 2/1991 | Stinson |
| 5,005,108 A | 4/1991 | Pristash et al. |
| 5,027,258 A | 6/1991 | Schoniger et al. |
| 5,040,098 A | 8/1991 | Tanaka et al. |
| 5,046,826 A | 9/1991 | Iwamoto et al. |
| 5,055,978 A | 10/1991 | Rogoff |
| 5,057,974 A | 10/1991 | Mizobe |
| 5,070,431 A | 12/1991 | Kitazawa et al. |
| 5,075,826 A | 12/1991 | Lan |
| 5,093,765 A | 3/1992 | Kashima et al. |
| 5,134,549 A | 7/1992 | Yokoyama |
| 5,136,480 A | 8/1992 | Pristash et al. |
| 5,136,483 A | 8/1992 | Schoniger et al. |
| 5,190,370 A | 3/1993 | Miller et al. |
| 5,207,493 A | 5/1993 | Murase et al. |
| 5,243,506 A | 9/1993 | Whitehead |
| 5,262,928 A | 11/1993 | Kashima et al. |
| 5,276,591 A | 1/1994 | Hegarty |
| 5,283,673 A | 2/1994 | Murase et al. |
| 5,339,179 A | 8/1994 | Rudisill et al. |
| 5,349,503 A | 9/1994 | Blonder et al. |
| 5,359,691 A | 10/1994 | Tai et al. |
| 5,365,411 A | 11/1994 | Rycroft et al. |
| 5,375,043 A | 12/1994 | Tokunaga |
| 5,377,084 A | 12/1994 | Kojima et al. |
| 5,390,085 A | 2/1995 | Mari-Roca et al. |
| 5,390,436 A | 2/1995 | Ashall |
| 5,394,308 A | 2/1995 | Watanabe et al. |
| 5,414,599 A | 5/1995 | Kaneko et al. |
| 5,428,912 A | 7/1995 | Grondal et al. |
| 5,467,208 A | 11/1995 | Kokawa et al. |
| 5,467,417 A | 11/1995 | Nakamura et al. |
| 5,475,533 A | 12/1995 | Steenblik et al. |
| 5,477,423 A | 12/1995 | Fredriksz et al. |
| 5,479,275 A | 12/1995 | Abileah |
| 5,485,291 A | 1/1996 | Qiao et al. |
| 5,528,720 A | 6/1996 | Winston et al. |
| 5,539,623 A | 7/1996 | Gurz et al. |
| 5,590,945 A | 1/1997 | Simms |
| 5,598,280 A | 1/1997 | Nishio et al. |
| 5,600,455 A | 2/1997 | Ishikawa et al. |
| 5,618,095 A | 4/1997 | Kashima et al. |
| 5,664,862 A | 9/1997 | Redmond et al. |
| 5,671,994 A | 9/1997 | Tai et al. |
| 5,719,649 A | 2/1998 | Shono et al. |
| 5,775,791 A | 7/1998 | Yoshikawa et al. |
| 5,779,337 A | 7/1998 | Saito et al. |
| 5,808,784 A | 9/1998 | Ando et al. |
| 5,851,062 A | 12/1998 | Shinohara et al. |
| 5,921,652 A | 7/1999 | Parker et al. |
| 5,947,578 A | 9/1999 | Ayres |
| 5,961,198 A | 10/1999 | Hira et al. |
| 5,971,559 A | 10/1999 | Ishikawa et al. |
| 5,999,685 A | 12/1999 | Goto et al. |
| 6,011,602 A | 1/2000 | Miyashita et al. |
| 6,036,329 A | 3/2000 | Iimura |
| 6,129,439 A | 10/2000 | Hou et al. |
| 6,130,730 A | 10/2000 | Jannson et al. |
| 6,167,182 A | 12/2000 | Shinohara et al. |
| 6,712,481 B2 | 3/2004 | Parker et al. |
| 6,745,506 B2 | 6/2004 | Maas et al. |
| 6,752,505 B2 | 6/2004 | Parker et al. |
| 6,755,547 B2 | 6/2004 | Parker |
| 6,827,456 B2 | 12/2004 | Parker et al. |
| 7,108,414 B2 | 9/2006 | McCollum et al. |
| 7,178,965 B2 | 2/2007 | Parker |
| 7,300,194 B2 | 11/2007 | Parker |
| 7,364,341 B2 | 4/2008 | Parker et al. |
| 7,364,342 B2 | 4/2008 | Parker et al. |
| 7,367,705 B2 | 5/2008 | McCollum et al. |
| 7,479,664 B2 | 1/2009 | Williams |
| 7,907,804 B2 * | 3/2011 | Meir et al. .................. 385/31 |
| 2006/0221638 A1 * | 10/2006 | Chew et al. .................. 362/613 |
| 2006/0274555 A1 | 12/2006 | Parker |
| 2007/0171669 A1 * | 7/2007 | Lee et al. .................. 362/600 |
| 2007/0296689 A1 | 12/2007 | Kimura et al. |
| 2008/0094344 A1 | 4/2008 | Kuroki |

FOREIGN PATENT DOCUMENTS

| | | |
|---|---|---|
| EP | 1930947 A1 | 6/2008 |
| JP | 2006134748 | 5/2006 |
| TW | 200424472 | 11/2004 |

OTHER PUBLICATIONS

Office Action dated Dec. 20, 2011 with partial English translation in Chinese Patent Application No. 200980136286.3, 23 pages (enclosed).

Adaptive scanning, 1-D dimming, and boosting backlight for LCD-TV systems, Journal of the SID 14/12, 2006 (Pierre de Greef et al), 8 pages (enclosed).

Power savings and enhancement of gray-scale capability of LCD TVs with an adaptive dimming technique, Journal of the SID 16/2, 2008 (Tomokazu Shiga et al), 6 pages (enclosed).

High-performance OCB-mode field-sequential-color LCD, Journal of the SID 16/2, 2008 (Takahiro Ishinabe et al), 6 pages (enclosed).

International Preliminary Report on Patentability dated Feb. 10, 2011, Application No. PCT/US2009/051916 (enclosed).

* cited by examiner

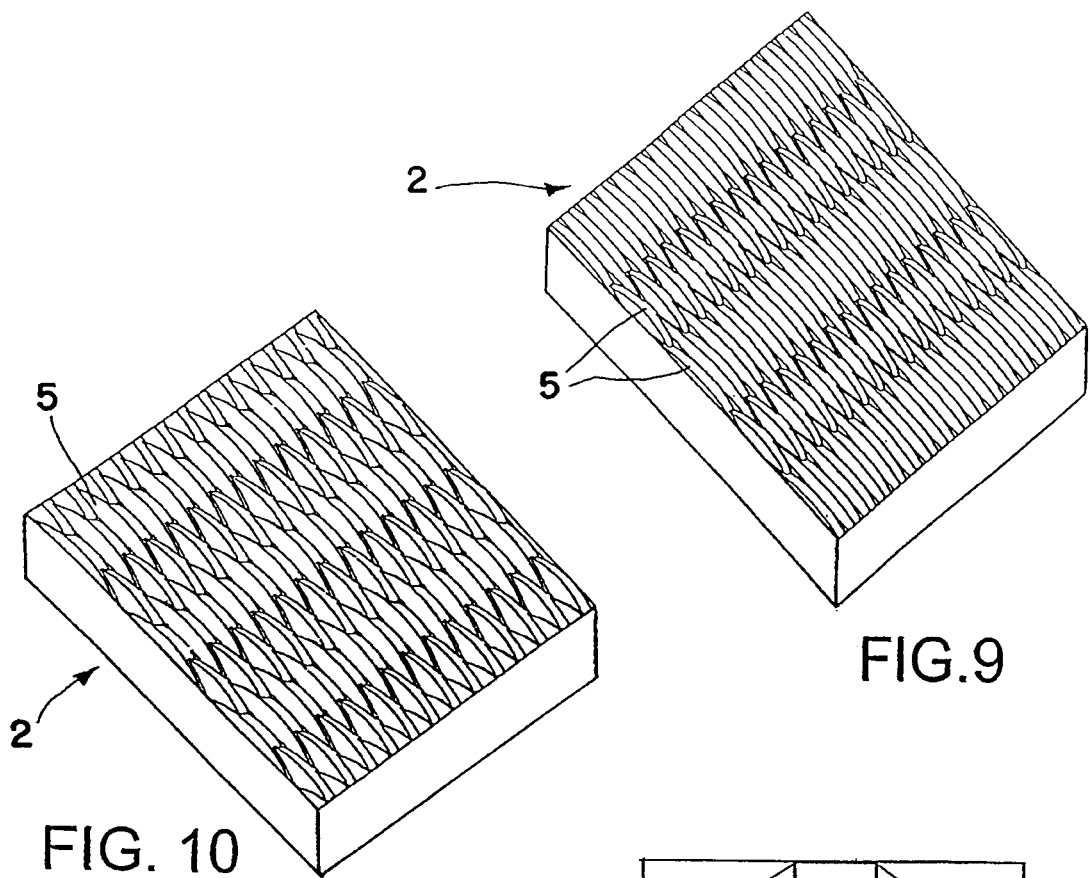
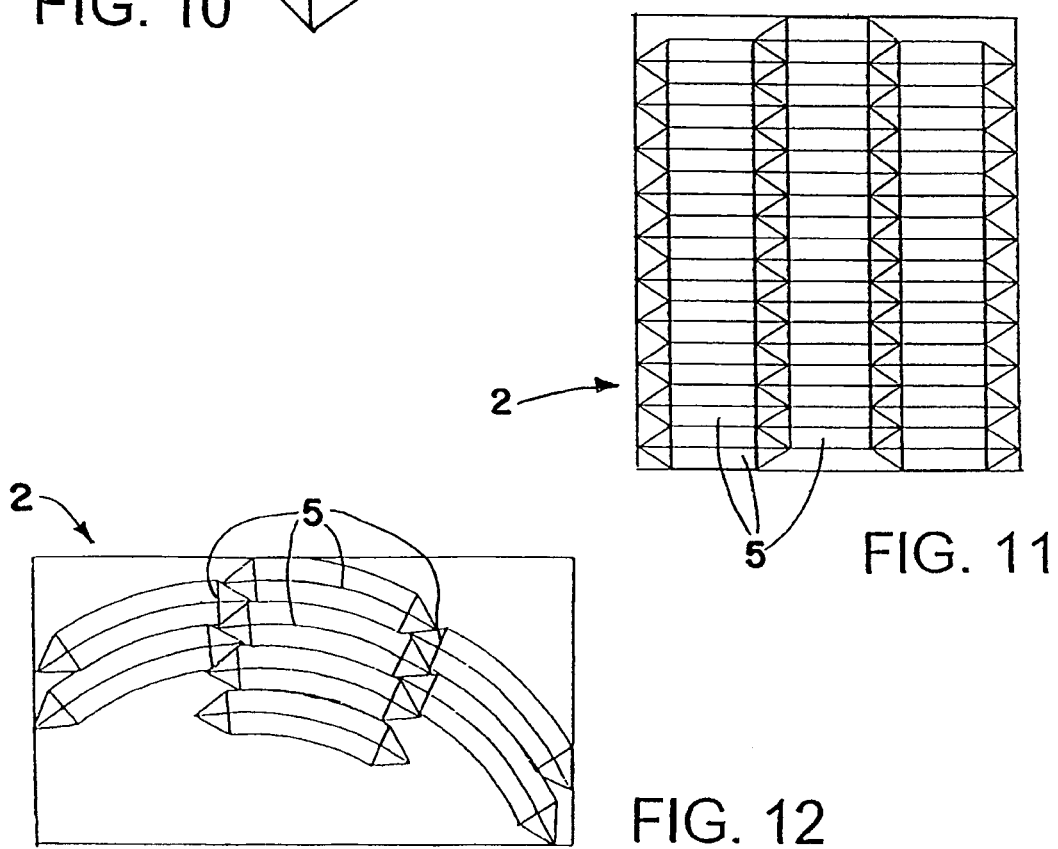
FIG. 9
FIG. 10
FIG. 11
FIG. 12

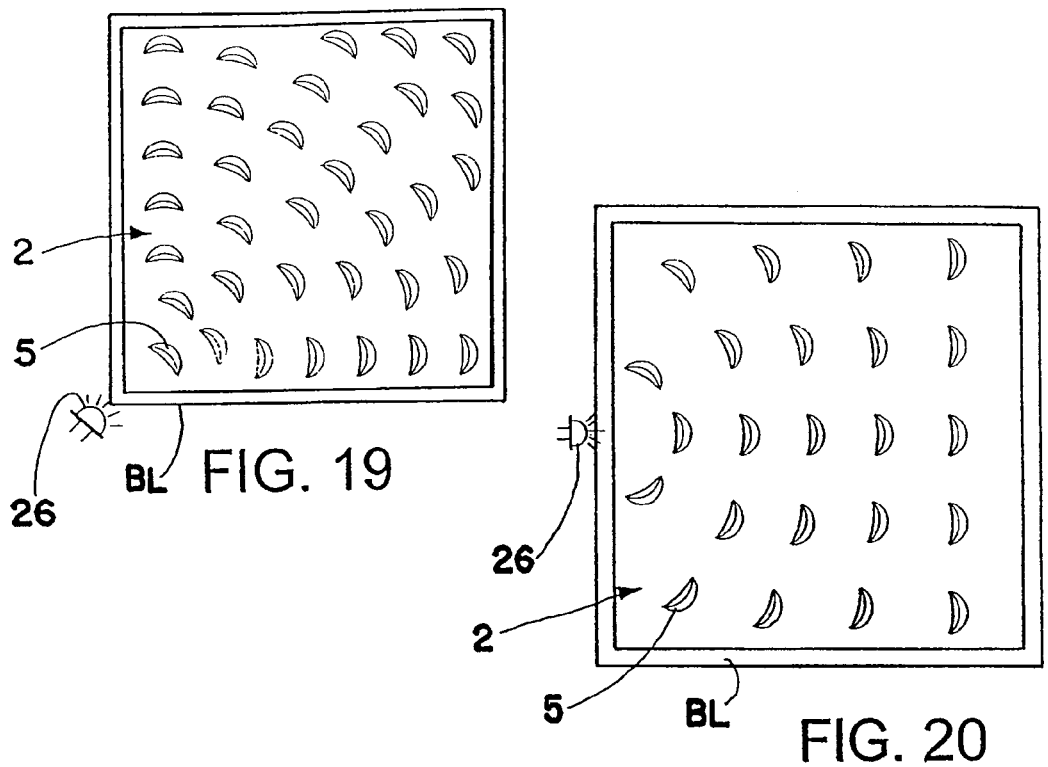
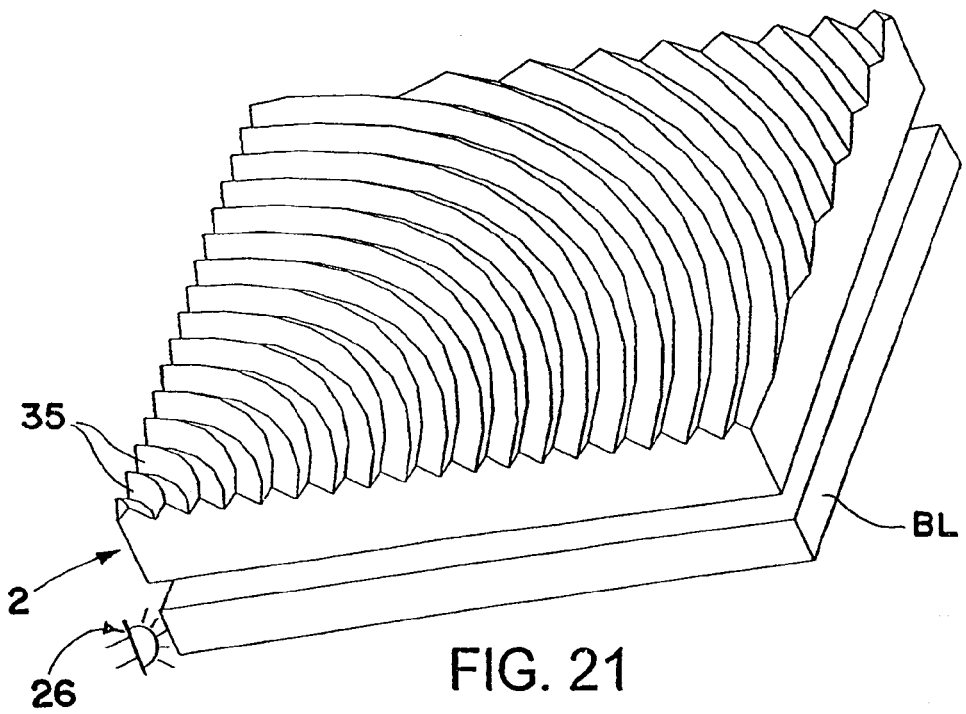

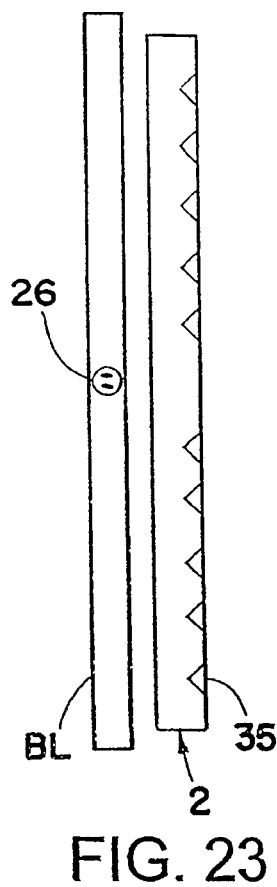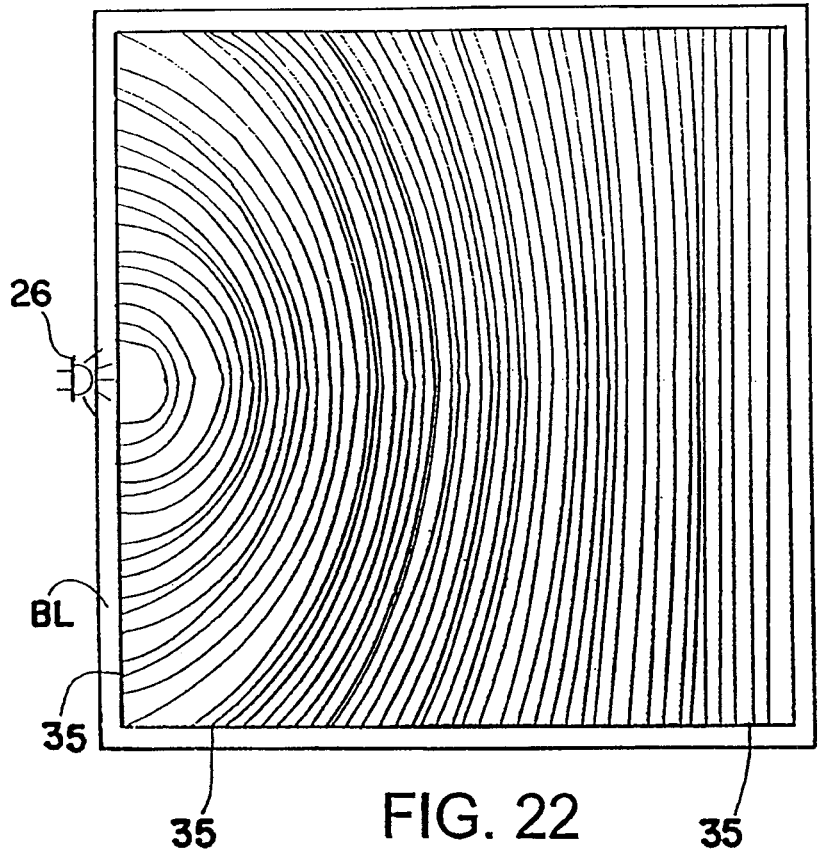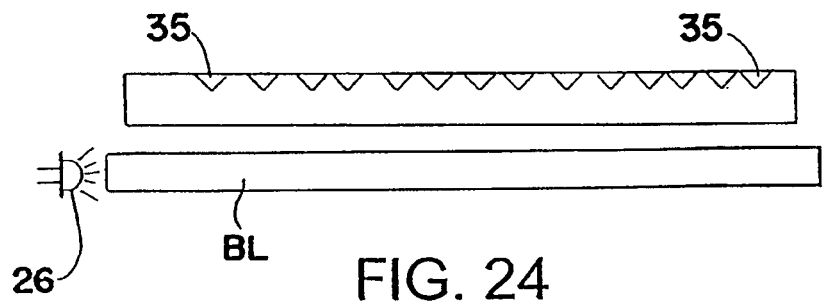
FIG. 23
FIG. 22
FIG. 24

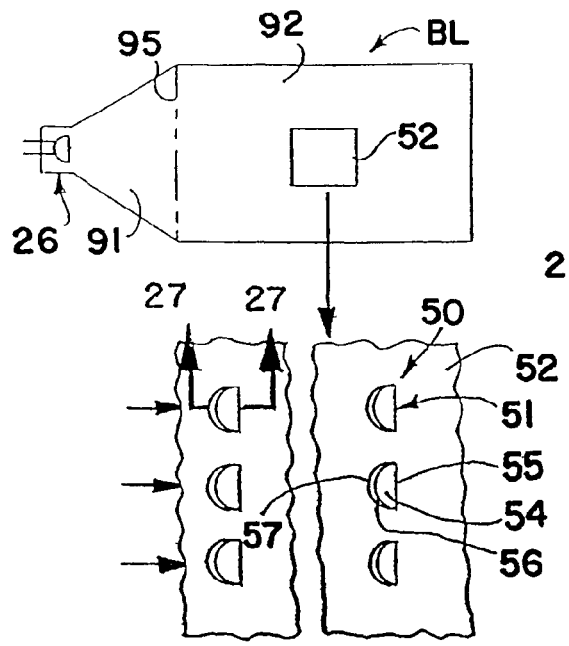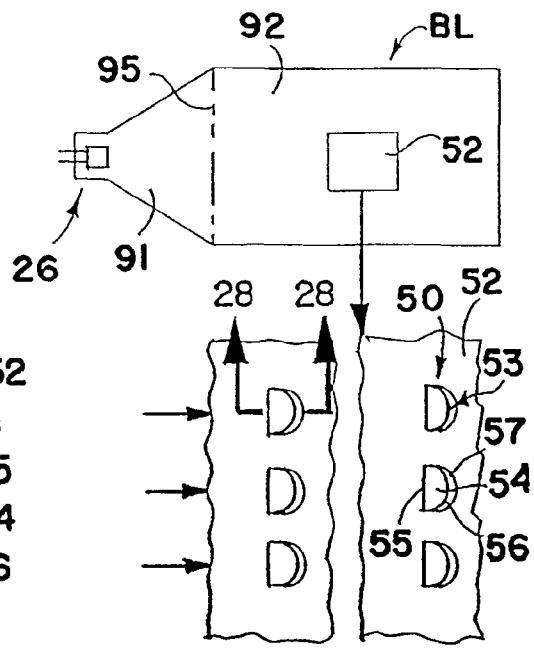
FIG. 25  FIG. 26
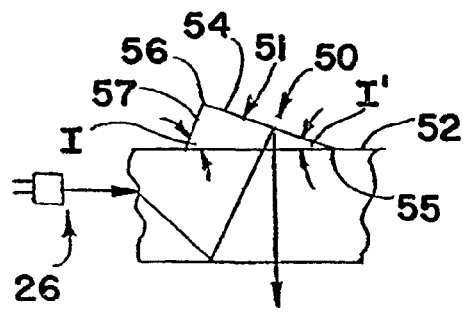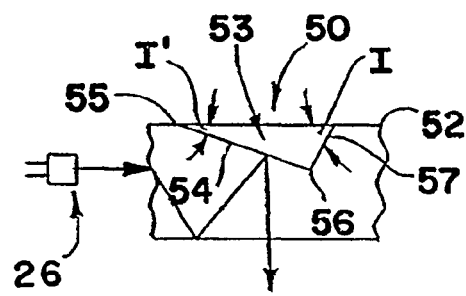
FIG. 27  FIG. 28
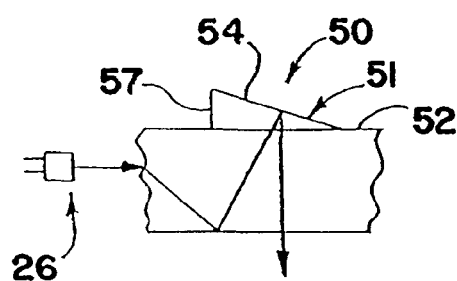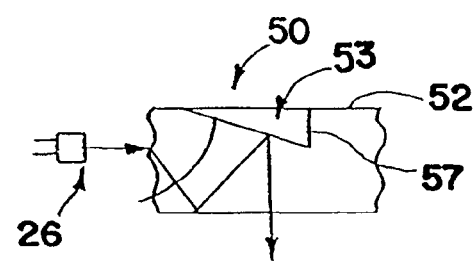
FIG. 29  FIG. 30

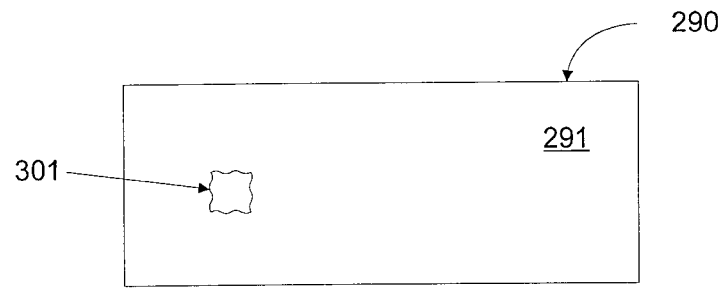
Fig. 77
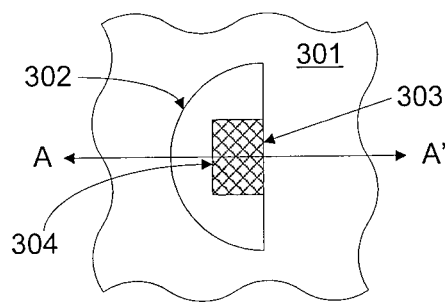
Fig. 78
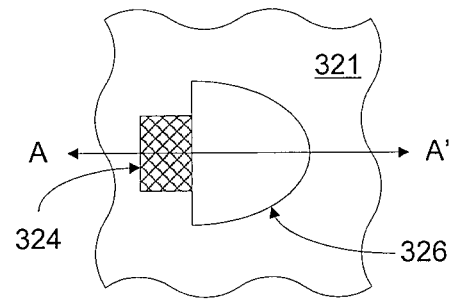
Fig. 79
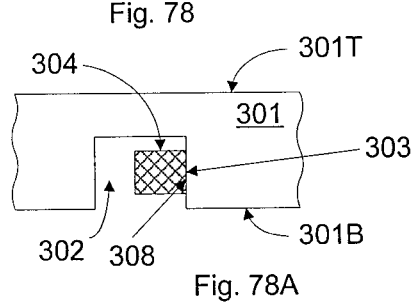
Fig. 78A
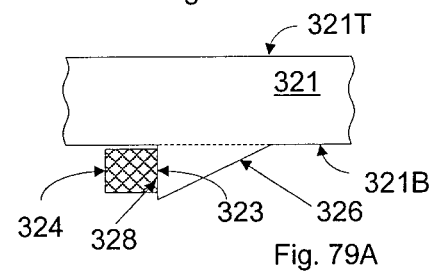
Fig. 79A
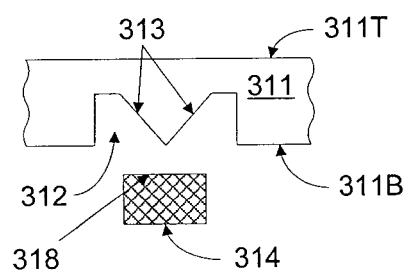
Fig. 78B
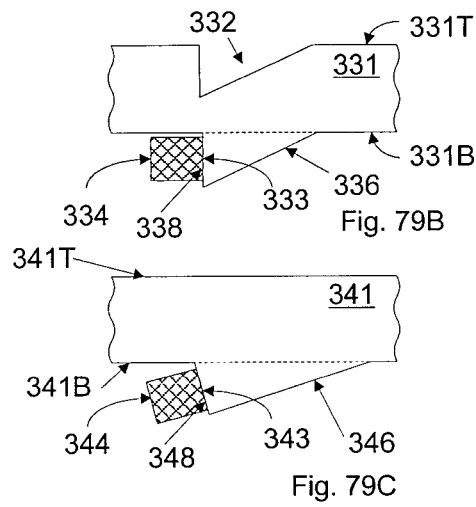
Fig. 79B
Fig. 79C

OPTICALLY TRANSMISSIVE SUBSTRATES AND LIGHT EMITTING ASSEMBLIES AND METHODS OF MAKING SAME, AND METHODS OF DISPLAYING IMAGES USING THE OPTICALLY TRANSMISSIVE SUBSTRATES AND LIGHT EMITTING ASSEMBLIES

CROSS-REFERENCE TO RELATED APPLICATIONS

This application claims the benefit of U.S. Provisional Application No. 61/085,193, filed Jul. 31, 2008, the entire disclosure of which is incorporated herein by reference.

FIELD OF THE INVENTION

This invention relates to various methods of making substantially random larger patterns of overlapping, intersecting or interlocking optical element shapes for use in forming patterns of optical elements on or in optically transmissive substrates. Furthermore, this invention relates to the fabrication of optically transmissive substrates and light emitting assemblies having the pattern of optical elements. Yet furthermore, this invention relates to displaying video of improved image quality by using the optically transmissive substrates and light emitting assemblies.

BACKGROUND OF THE INVENTION

It is generally known to provide individual optical elements on or in one or more surfaces of optically transmissive substrates including films, sheets or plates for redirecting light passing through such substrates. These optical elements may be three-dimensional optical elements of well defined shape each having a length and width substantially smaller than the length and width of the substrates rather than continuous optical elements that run substantially the full width or length of the substrates.

When a larger pattern of these individual optical elements is desired, one known fabrication method is to tile together multiple first or second generation copies of a master having the desired pattern of individual optical element shapes thereon to produce a larger pattern of the individual optical element shapes that is used to make the larger pattern of optical elements on or in the substrates. This substantially cuts down on the machining time that would be required to make a master having the larger pattern of individual optical element shapes therein.

In the case of non-overlapping optical element shapes or optical element shapes that overlap in a regular pattern, it is relatively easy to align the edges of copies of the master during tiling of the copies together so that minimal disruptions in the pattern of optical element shapes is evident in the larger pattern. However, when the overlapping optical element shapes in the master are substantially random, the edges of the copies that are made from the master will normally align in a fashion that causes substantial discontinuities in the optical element shapes along the edges and hence the pattern at large. Thus there is a need to be able to minimize any discontinuities in a larger pattern of substantially random optical element shapes where the edges of the copies meet.

SUMMARY OF THE INVENTION

In accordance with one aspect of the invention, any discontinuities in a larger substantially random pattern of overlapping, intersecting or interlocking optical element shapes may be minimized by making a master having a pattern of overlapping, intersecting or interlocking optical element shapes that are substantially random except along at least one edge of the master where the optical element shapes match the optical element shapes along an other edge, making copies of the master, and tiling the copies together with the optical element shapes aligned along adjacent edges to produce a larger pattern of the optical element shapes with minimal discontinuities in the larger pattern where the edges of the copies meet.

In accordance with another aspect of the invention, the larger pattern of optical element shapes may be used to form a corresponding pattern of optical elements on or in an optically transmissive substrate.

In accordance with another aspect of the invention, the edges of the master may be formed by cutting or trimming respective sides of the master which have optical element shapes along the respective sides that are substantially identical to each other in placement and form.

In accordance with another aspect of the invention, the edges of the master have at least some partial optical element shapes which when aligned provide minimal discontinuities in the optical element shapes along the edges.

In accordance with another aspect of the invention, the copies may be made from the master by a deposition process, a molding process, a hot press process, an embossing process, an extrusion process, or a thermoforming process.

In accordance with another aspect of the invention, the copies may be made in a continuous roll-to-roll process.

In accordance with another aspect of the invention, the larger pattern of optical elements may be formed on or in the substrate by a deposition process, a molding process, a hot press process, an embossing process, an extrusion process, or a thermoforming process.

In accordance with another aspect of the invention, the larger pattern of optical elements may be made in a continuous roll-to-roll process.

In accordance with another aspect of the invention, light sources and the optically transmissive substrates can be used to make light emitting modules.

In accordance with another aspect of the invention, the light emitting modules can be tiled to make light emitting assemblies.

In accordance with another aspect of the invention, the luminance profiles of the light emitting assemblies or modules can be configured such that the luminance values are within a prescribed range of a mean luminance value and the luminance varies gradually from the first end point at one end of the light emitting assemblies or modules to the second end point at the opposite end of the light emitting assemblies or modules.

In accordance with another aspect of the invention, the light emitting assemblies or modules can be used to display video of improved image quality by a two-dimensional or one-dimensional localized dimming or boosting of the luminance.

In accordance with another aspect of the invention, the light emitting assemblies or modules can be used to display video of improved image quality by single-pulse or dual-pulse driving of the light sources, or an interpolation therebetween.

In accordance with another aspect of the invention, the light emitting assemblies or modules can be used to display video in a color-sequential LCD apparatus, wherein the assemblies or modules comprise light sources of the component colors.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIGS. 5-20 are schematic perspective or plan views showing different patterns of individual optical elements on or in optically transmissive substrates, (including films, sheets, and plates) of the present invention;

FIG. 21 is a schematic perspective view of an optically transmissive substrate (including film, sheet, or plate) having optical grooves extending across the substrate in a curved pattern facing a corner of the substrate;

FIG. 22 is a top plan view of an optically transmissive substrate (including film, sheet, or plate) having a pattern of optical grooves extending across the substrate facing a midpoint on one edge of the substrate that decreases in curvature as the distance from the one edge increases;

FIG. 23 is an end elevation view of the optically transmissive substrate of FIG. 22 as seen from the left end thereof;

FIG. 24 is a side elevation view of the optically transmissive substrate of FIG. 22;

FIGS. 25 and 26 are enlarged schematic fragmentary plan views of a surface area of a backlight or light emitting panel assembly showing various forms of optical deformities formed on or in a surface of an optically transmissive substrate (including film, sheet, or plate);

FIGS. 27 and 28 are enlarged longitudinal sections through one of the optical deformities of FIGS. 25 and 26, respectively;

FIGS. 29 and 30 are enlarged schematic longitudinal sections through other forms of optical deformities formed on or in a surface of an optically transmissive substrate (including film, sheet, or plate);

FIG. 77 is a schematic bottom plan view of a light emitting module in accordance with the present invention;

FIG. 78 is a schematic bottom plan view of a portion of an optically transmissive substrate of FIG. 77, with a depression in the substrate;

FIG. 78A is a schematic cross sectional view along line A-A' of FIG. 78;

FIG. 78B is a schematic cross sectional view of a portion of an optically transmissive substrate in accordance with the present invention with a prismatic light input surface;

FIG. 79 is a schematic bottom plan view of a portion of an optically transmissive substrate in accordance with the present invention, with a projection on the substrate;

FIG. 79A is a schematic cross sectional view along line A-A' of FIG. 79;

FIG. 79B is a schematic cross sectional view of a portion of an optically transmissive substrate in accordance with the present invention, with a projection on the substrate and a depression in the substrate; and FIG. 79C is a schematic sectional view of a portion of an optically transmissive substrate in accordance with the present invention with a projection on the substrate having a light input surface that is at an oblique angle relative to the two major planar surfaces.

DETAILED DESCRIPTION OF THE INVENTION

Figure 1:
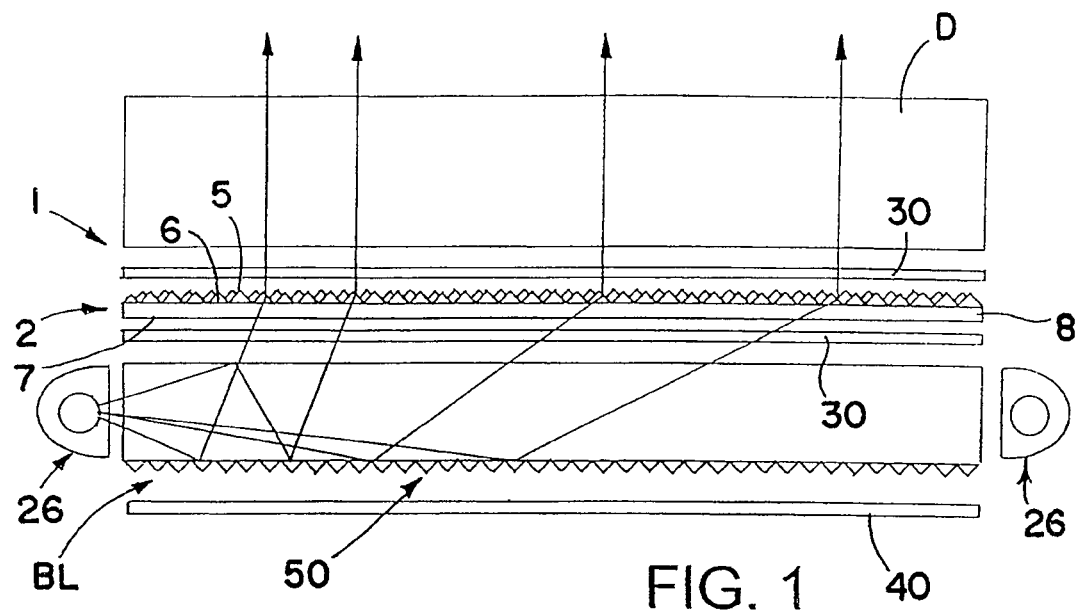
FIG. 1 is a schematic side elevation view of one form of a backlight assembly in accordance with the present invention, shown with a transmissive liquid crystal display.
Figure 2:
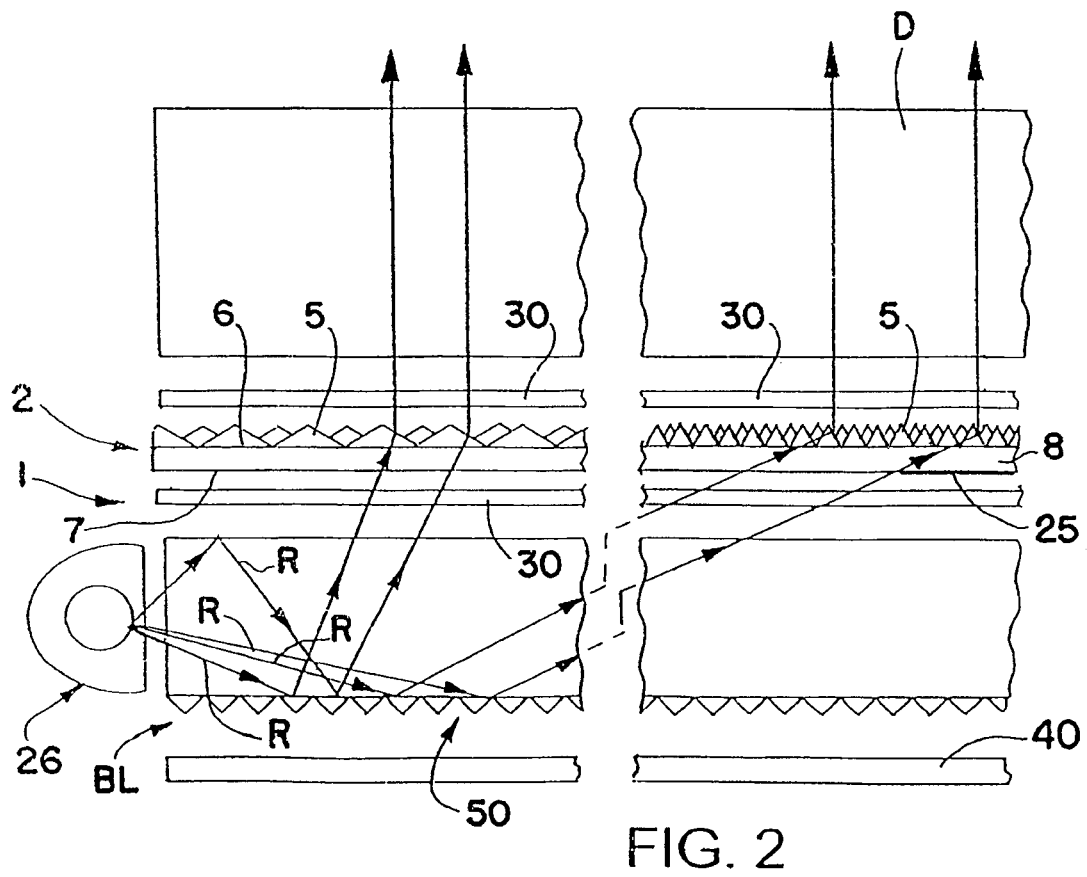
FIG. 2 is an enlarged fragmentary side elevation view of a portion of the backlight assembly of FIG. 1.

FIGS. 1 and 2 schematically show one form of backlight system 1 in accordance with this invention including an optically transmissive substrate (including film, sheet, or plate) 2 that redistributes more of the light emitted by a backlight light guide BL or other light source toward a direction more normal to the surface of the substrate. Optically transmissive substrate 2 may be used to redistribute light within a desired viewing angle from almost any light source for lighting, for example, a display D such as a liquid crystal display, used in laptop computers, word processors, avionic displays, cell phones, PDAs and the like, to make the displays brighter. The liquid crystal display can be any type including a transmissive liquid crystal display as schematically shown in FIGS. 1 and 2, a reflective liquid crystal display as schematically shown in FIG. 3 and a transflective liquid crystal display as schematically shown in FIG. 4.

Figure 3:
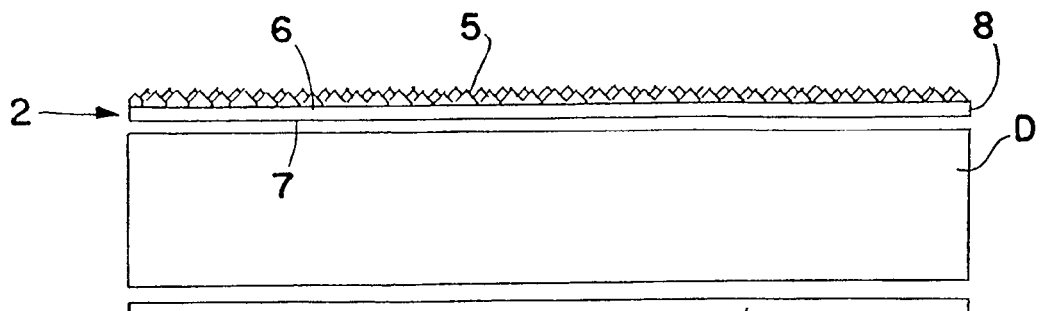
FIG. 3 is a schematic side elevation view of a reflective liquid crystal display, which can be used with a backlight assembly of the present invention.

The reflective liquid crystal display D shown in FIG. 3 includes a back reflector 40 adjacent the back side for reflecting ambient light entering the display back out the display to increase the brightness of the display. The optically transmissive substrate 2 of the present invention is placed adjacent the top of the reflective liquid crystal display to redirect ambient light (or light from a front light) into the display toward a direction more normal to the plane of the substrate for reflection back out by the back reflector within a desired viewing angle to increase the brightness of the display. Optically transmissive substrate 2 may be attached to, laminated to or otherwise held in place against the top of the liquid crystal display.

Figure 4:
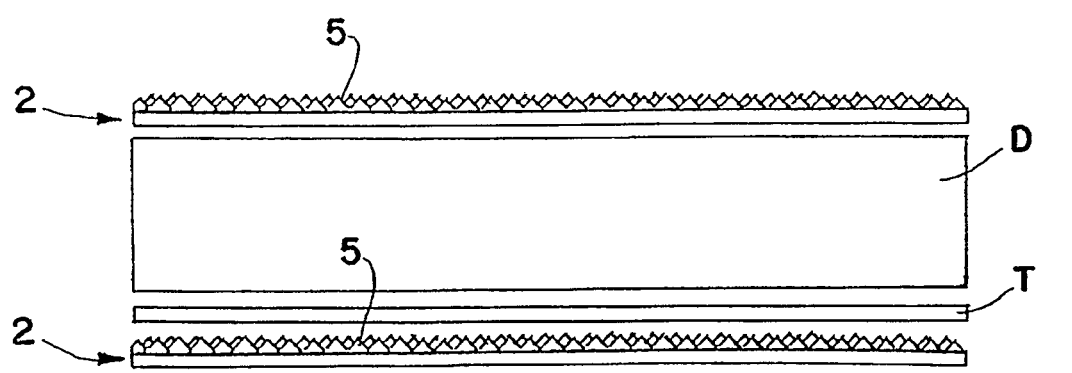
FIG. 4 is a schematic side elevation view of another form of backlight assembly of the present invention.

The transflective liquid crystal display D shown in FIG. 4 includes a transreflector T placed between the display and a backlight light guide BL for reflecting ambient light entering the front of the display back out the display to increase the brightness of the display in a lighted environment, and for transmitting light from the backlight through the transreflector and out the display to illuminate the display in a dark environment. In this embodiment the optically transmissive substrate 2 may either be placed adjacent the top of the display or adjacent the bottom of the display or both as schematically shown in FIG. 4 for redirecting or redistributing ambient light and/or light from the backlight light guide more normal to the plane of the substrate to make the light ray output distribution more acceptable to travel through the display to increase the brightness of the display.

Optically transmissive substrate 2 comprises a thin transparent substrate (including film, sheet, or plate) 8 having a pattern of discrete individual optical elements 5 of well defined shape on the light exit surface 6 of the film for refracting the incident light distribution such that the distribution of the light exiting the film is in a direction more normal to the surface of the substrate (see FIG. 1).

Figure 5:
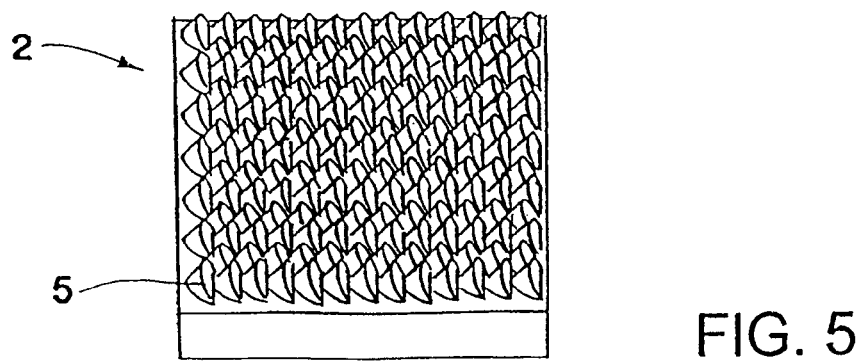
Figure 5A:
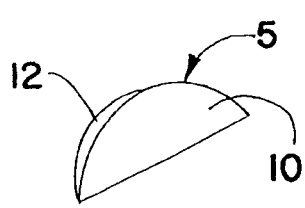
FIGS. 5a-5n are schematic perspective views of different geometric shapes that the individual optical elements on or in the optically transmissive substrates (including films, sheets, and plates) may take.
Figure 5B:
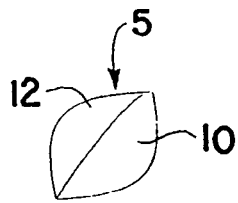

Each of the individual optical elements 5 has a width and length many times smaller than the width and length of the substrate, and may be formed by depressions in or projections on the exit surface of the substrate. These individual optical elements 5 include at least one sloping surface for refracting the incident light toward the direction normal to the light exit surface. FIG. 5 shows one pattern of individual optical elements 5 on a substrate 2. These optical elements may take many different shapes. For example, FIG. 5a shows a non-prismatic optical element 5 having a total of two surfaces 10, 12, both of which are sloping. One of the surfaces 10 shown in FIG. 5a is planar or flat whereas the other surface 12 is curved. Moreover, both surfaces 10, 12 intersect each other and also intersect the surface of the substrate. Alternatively, both surfaces 10, 12 of the individual optical elements may be curved as schematically shown in FIG. 5b.

Figure 5C:
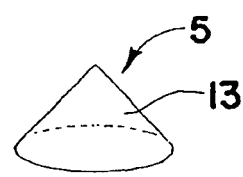
Figure 5D:
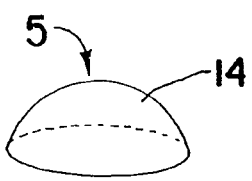

Alternatively, the optical elements 5 may each have only one surface that is curved and sloping and intersects the substrate. FIG. 5c shows one such optical element 5 in the shape of a cone 13, whereas FIG. 5d shows another such optical element having a semispherical or dome shape 14. Also, such optical elements may have more than one sloping surface intersecting the substrate.

Figure 5E:
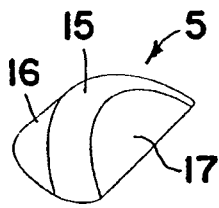

FIG. 5e shows an optical element 5 having a total of three surfaces, all of which intersect the substrate and intersect each other. Two of the surfaces 15 and 16 are curved, whereas the third surface 17 is planar.

Figure 5F:
Figure 5G:
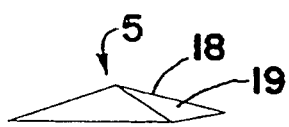
Figure 5H:
Figure 5I:

FIG. 5f shows an optical element 5 in the shape of a pyramid 18 with four triangular shaped sides 19 that intersect each other and intersect the substrate. The sides 19 of the pyramid 18 may all be of the same size and shape as shown in FIG. 5f, or the sides 19 of the pyramids 18 may be stretched so the sides have different perimeter shapes as shown in FIG. 5g. Also, the optical elements 5 may have any number of planar sloping sides. FIG. 5h shows an optical element 5 with four planar sloping sides 20, whereas FIG. 5i shows an optical element 5 with eight planar sloping sides 20.

Figure 5J:
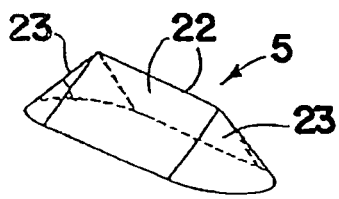
Figure 5K:
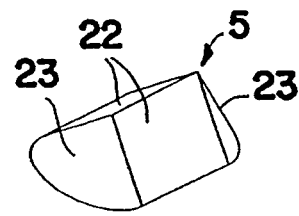
Figure 5L:
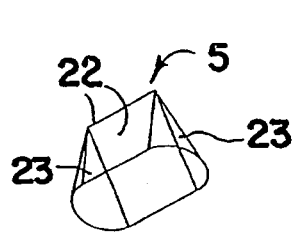
Figure 5M:
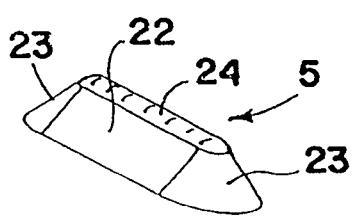
Figure 5N:
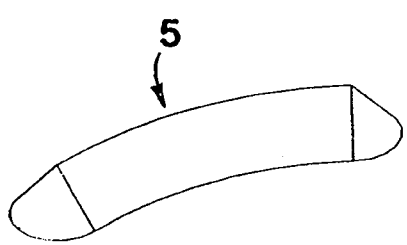
Figure 6:
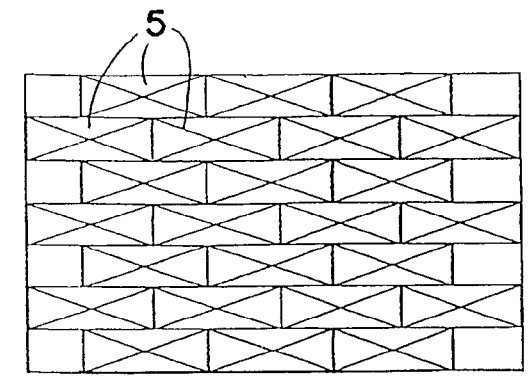

The individual optical elements 5 may also have more than one curved and more than one planar sloping surface, all intersecting the substrate. FIG. 5j shows an optical element 5 having a pair of intersecting oppositely sloping planar sides 22 and oppositely rounded or curved ends or sides 23. Further, the sloping planar sides 22 and curved ends or sides 23 may have different angled slopes as shown in FIGS. 5k and 5l. Moreover, the optical elements 5 may have at least one curved surface that does not intersect the substrate. One such optical element 5 is shown in FIG. 5m which includes a pair of oppositely sloping planar sides 22 and oppositely rounded or curved ends or sides 23 and a rounded or curved top 24 intersecting the oppositely sloping sides and oppositely rounded ends. Further, the optical elements 5 may be curved along their length as shown in FIG. 5n.

Providing the individual optical elements 5 with a combination of planar and curved surfaces redirects or redistributes a larger viewing area than is possible with a grooved substrate. Also, the curvature of the surfaces, or the ratio of the curved area to the planar area of the individual optical elements may be varied to tailor the light output distribution of the substrate to customize the viewing area of a display device used in conjunction with the substrate.

The light entrance surface 7 of the substrate 2 may have an optical coating 25 (see FIG. 2) such as an antireflective coating, a reflective polarizer, a retardation coating or a polarizer. Also, a matte or diffuse texture may be provided on the light entrance surface 7 depending on the visual appearance desired. A matte finish produces a softer image but is not as bright. The combination of planar and curved surfaces of the individual optical elements 5 of the present invention may be configured to redirect some of the light rays impinging thereon in different directions to produce a softer image without the need for an additional diffuser or matte finish on the entrance surface of the substrate.

Figure 7:
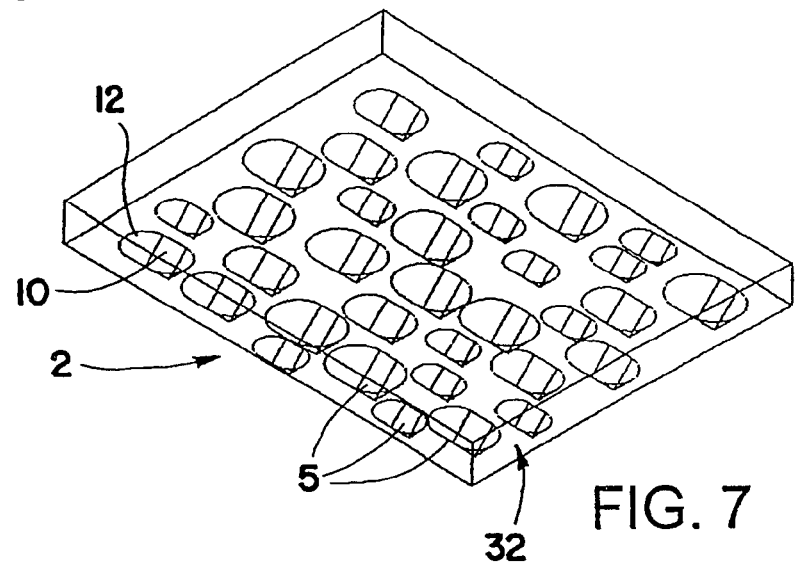
Figure 8:
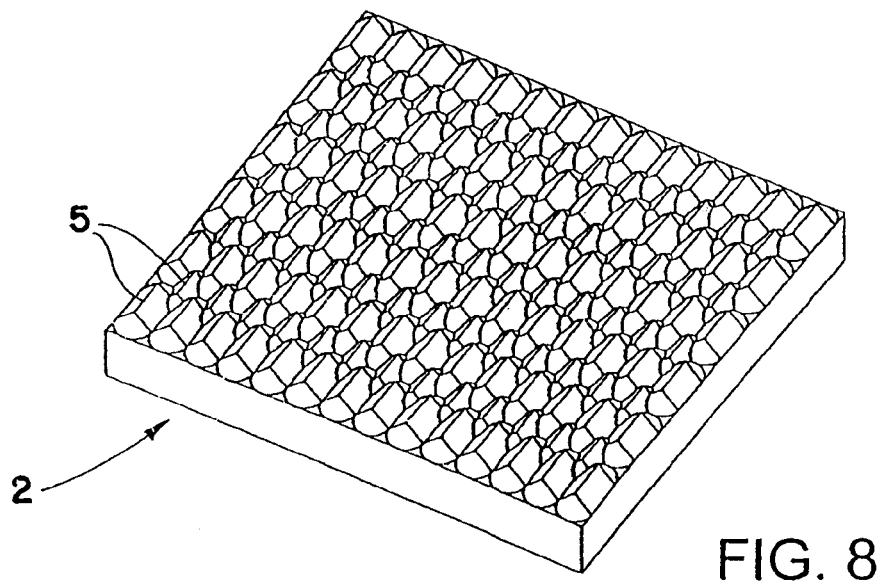

The individual optical elements 5 of the optically transmissive substrate 2 also desirably overlap each other in a staggered, interlocked and/or intersecting configuration, creating an optical structure with excellent surface area coverage. FIGS. 6, 7, 13 and 15, for example, show optical elements 5 staggered with respect to each other; FIGS. 8-10 show the optical elements 5 intersecting each other; and FIGS. 11 and 12 show the optical elements 5 interlocking each other.

Moreover, the slope angle, density, position, orientation, height or depth, shape, and/or size of the optical elements 5 of the optically transmissive substrate 2 may be matched or tuned to the particular light output distribution of a backlight light guide BL or other light source to account for variations in the distribution of light emitted by the backlight in order to redistribute more of the light emitted by the backlight within a desired viewing angle. For example, the angle that the sloping surfaces (e.g., surfaces 10, 12) of the optical elements 5 make with the surface of the optically transmissive substrate 2 may be varied as the distance from a light source 26 increases to account for the way the backlight light guide emits light rays R at different angles as the distance from the light source increases as schematically shown in FIG. 2. Also, the backlight light guide BL itself may be designed to emit more of the light rays at lower angles to increase the amount of light emitted by the backlight light guide and rely on the optically transmissive substrate 2 to redistribute more of the emitted light within a desired viewing angle. In this way the individual optical elements 5 of the optically transmissive substrate 2 may be selected to work in conjunction with the optical deformations of the backlight light guide to produce an optimized output light ray angle distribution from the system.

FIGS. 2, 5 and 9 show different patterns of individual optical elements 5 all of the same height or depth, whereas FIGS. 7, 8, 10, 13 and 14 show different patterns of individual optical elements 5 of different shapes, sizes and height or depth.

Figure 13:
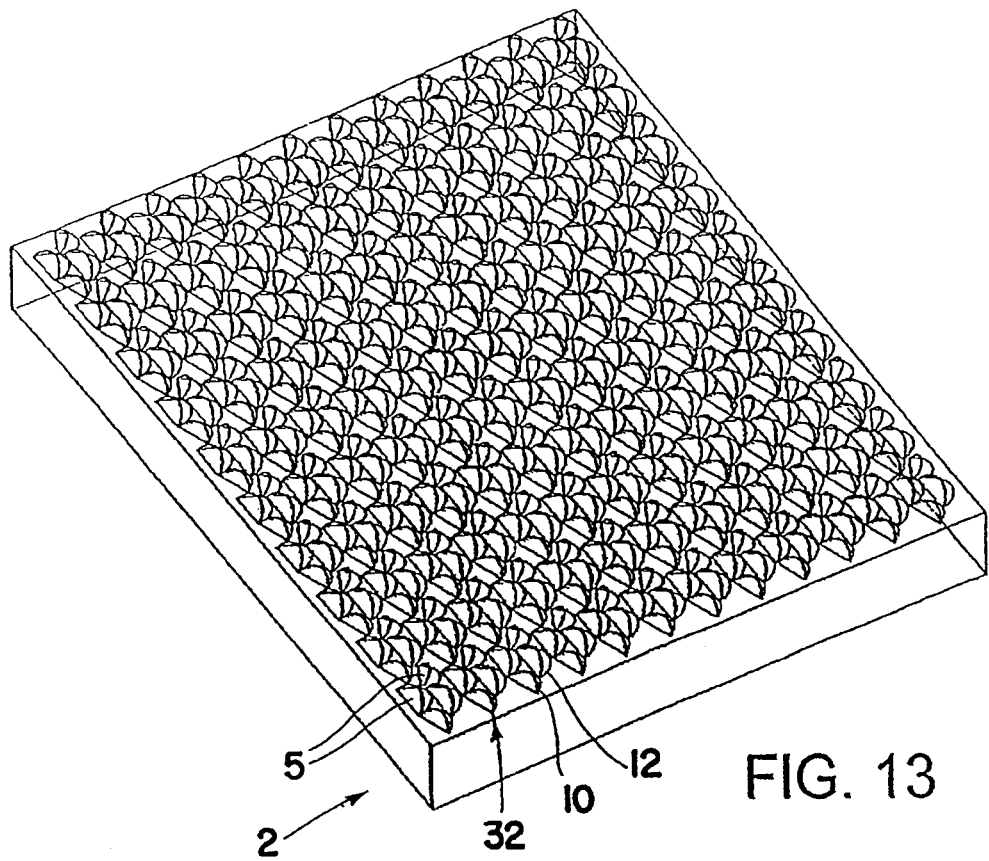
Figure 14:
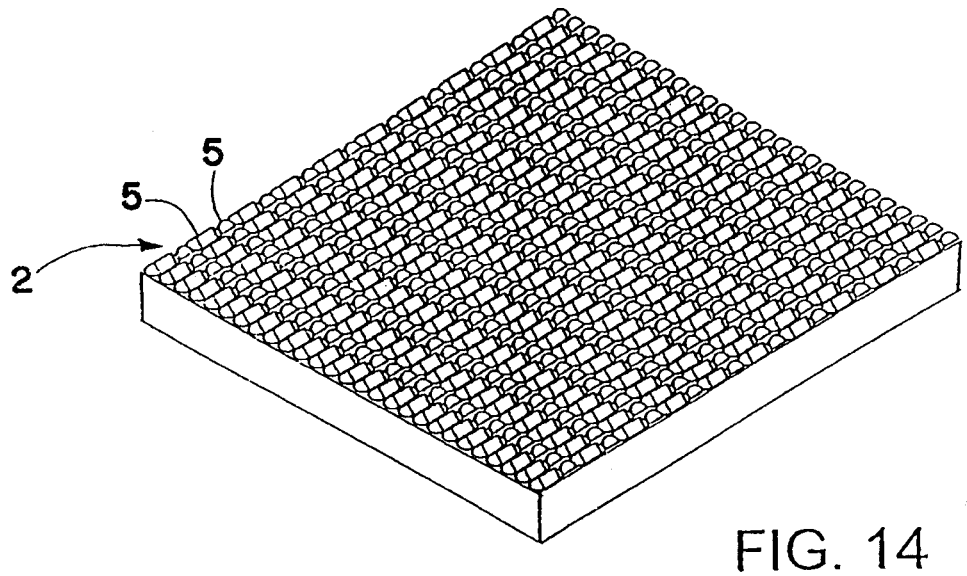
Figure 15:
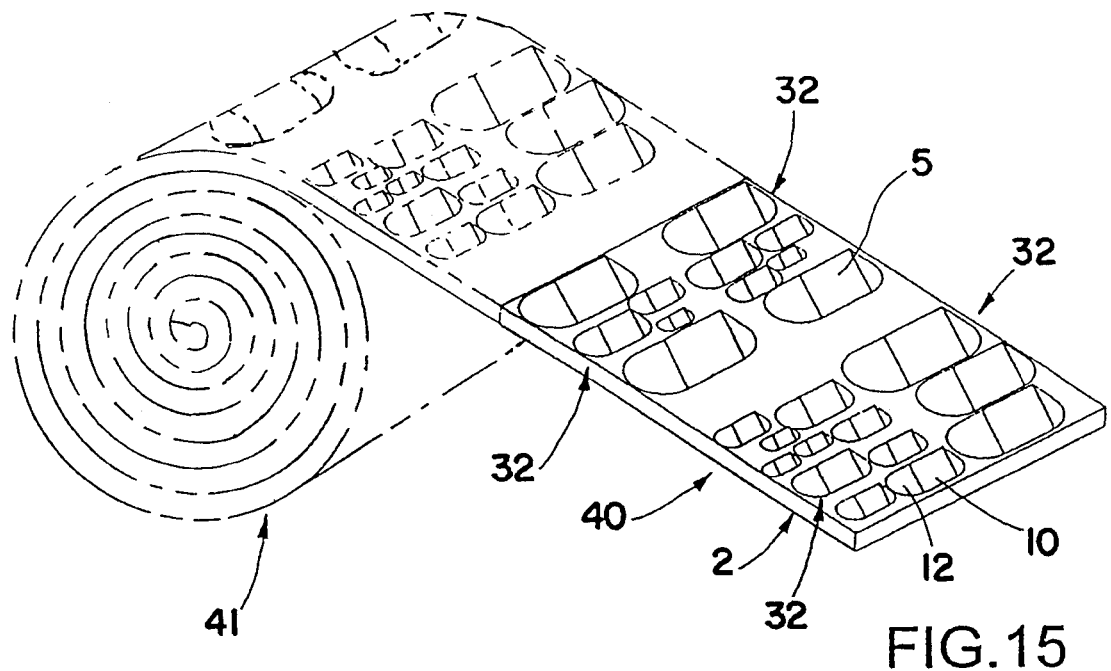
Figure 16:
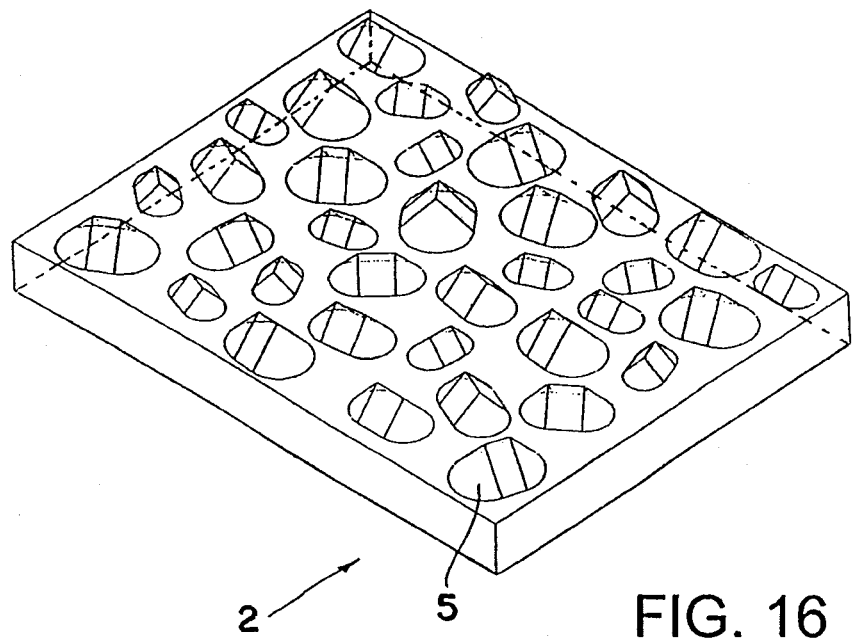
Figure 17:
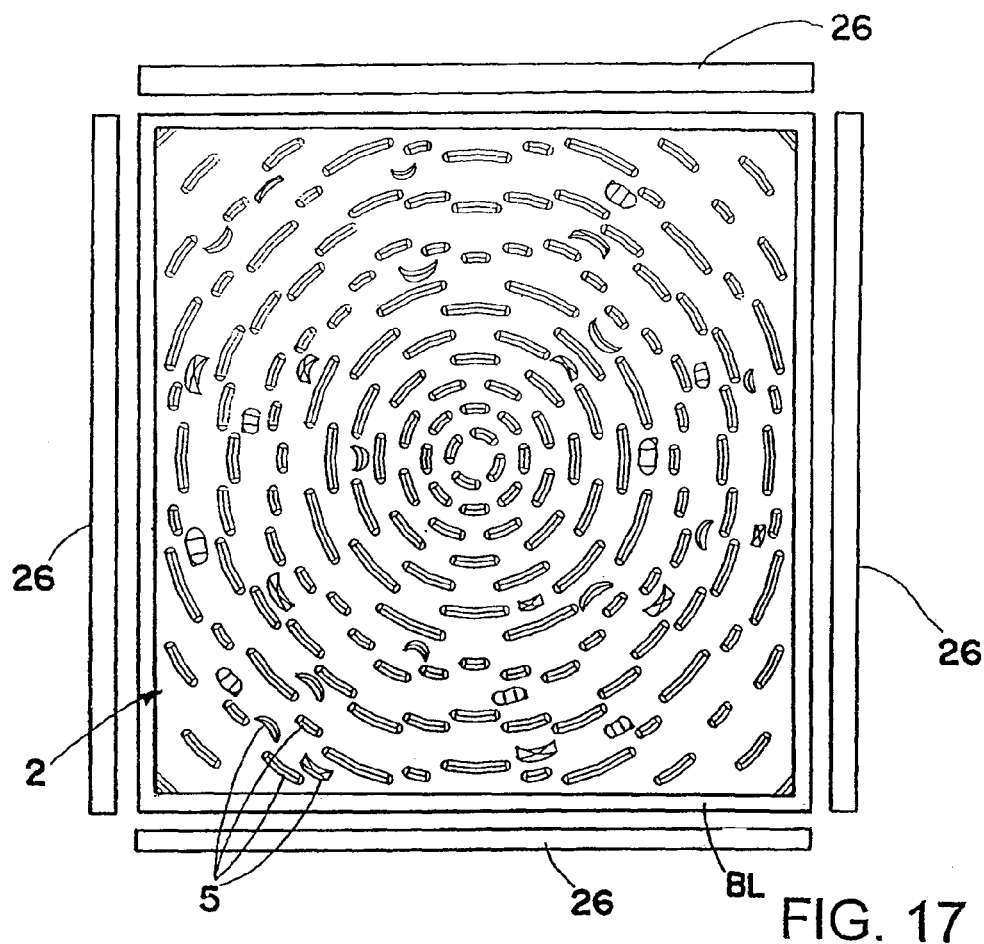

The individual optical elements 5 may also be randomized on the substrate 2 as schematically shown in FIGS. 16 and 17 in such a way as to eliminate any interference with the pixel spacing of a liquid crystal display. This eliminates the need for optical diffuser layers 30 shown in FIGS. 1 and 2 to defeat moiré and similar effects. Moreover, at least some of the individual optical elements 5 may be arranged in groupings 32 across the substrate, with at least some of the optical elements 5 in each grouping having a different size or shape characteristic that collectively produce an average size or shape characteristic for each of the groupings that varies across the substrate as schematically shown in FIGS. 7, 13 and 15 to obtain characteristic values beyond machining tolerances to defeat moiré and interference effects with the liquid crystal display pixel spacing. For example, at least some of the optical elements 5 in each grouping 32 may have a different depth or height that collectively produce an average depth or height characteristic for each grouping that varies across the substrate. Also, at least some of the optical elements in each grouping may have a different slope angle that collectively produce an average slope angle for each grouping that varies across the substrate. Further, at least one sloping surface of the individual optical elements in each grouping may have a different width or length that collectively produce an average width or length characteristic in each grouping that varies across the substrate.

Where the individual optical elements 5 include a combination of planar and curved surfaces 10, 12, the curvature of the curved surfaces 12, or the ratio of the curved area to the planar area of the individual optical elements as well as the perimeter shapes of the curved and planar surfaces may be varied to tailor the light output distribution of the substrate. In addition, the curvature of the curved surfaces, or the ratio of the curved area to the planar area of the individual optical elements may be varied to redirect more or less light that is traveling in a plane that would be parallel to the grooves of a prismatic or lenticular grooved film or substrate, partially or completely replacing the need for a second layer of light redirecting film or substrate. Also, at least some of the individual optical elements may be oriented at different angles relative to each other as schematically shown in FIGS. 13 and 16 to redistribute more of the light emitted by a light source along two different axes in a direction more normal to the surface of the substrate, partially or completely replacing the need for a second layer of light redirecting film or substrate. However, it will be appreciated that two layers of such light redirecting film or substrate each having the same or different patterns of individual optical elements 5 thereon may be placed between a light source and viewing area with the layers rotated 90 degrees (or other angles greater than 0 degrees and less than 90 degrees) with respect to each other so that the individual optical elements on the respective film or substrate layers redistribute more of the light emitted by a light source traveling in different planar directions in a direction more normal to the surface of the respective films or substrates.

Also, the optically transmissive substrate 2 may have a pattern of optical elements 5 that varies at different locations on the substrate as schematically shown in FIG. 15 to redistribute the light ray output distribution from different locations of a backlight light guide or other light source to redistribute the light ray output distribution from the different locations toward a direction normal to the substrate.

Further, the properties and pattern of the optical elements of the optically transmissive substrate may be customized to optimize the optically transmissive substrate for different types of light sources which emit different light distributions, for example, one pattern for single bulb laptops, another pattern for double bulb flat panel displays, and so on.

FIG. 17 shows the optical elements 5 arranged in a radial pattern from the outside edges of the substrate 2 toward the center to redistribute the light ray output distribution of a backlight light guide BL that receives light from cold cathode fluorescent lamps 26 along all four side edges of the backlight light guide.

Figure 18:
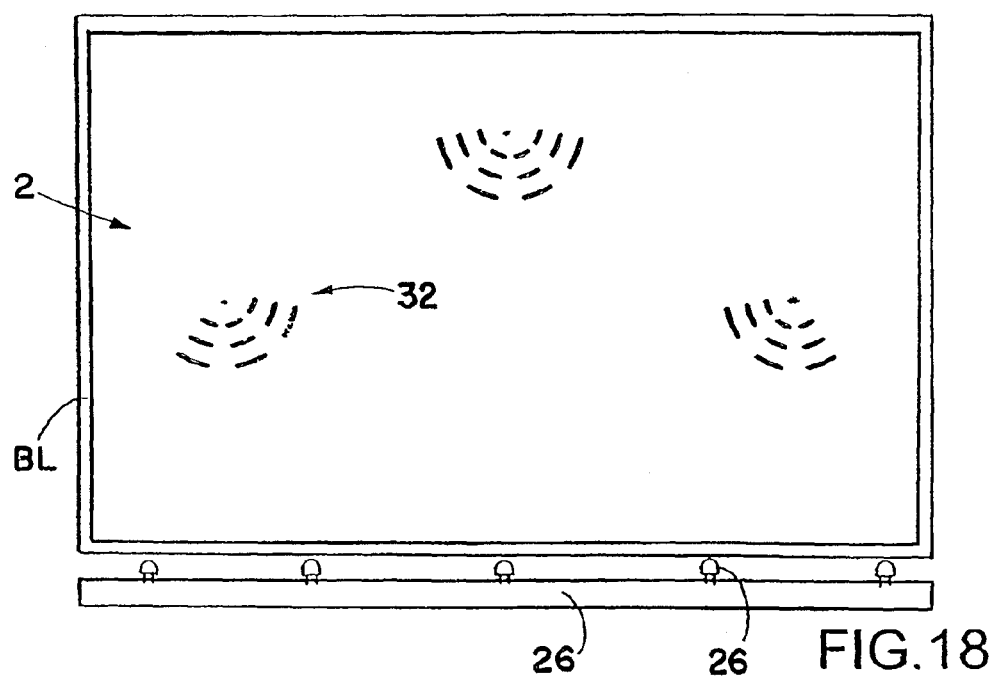

FIG. 18 shows the optical elements 5 arranged in a pattern of angled groupings 32 across the substrate 2 that are tailored to redistribute the light ray output distribution of a backlight light guide BL that receives light from one cold cathode fluorescent lamp 26 or a plurality of light emitting diodes 26 along one input edge of the backlight light guide.

FIG. 19 shows the optical elements 5 arranged in a radial type pattern facing a corner of the substrate 2 to redistribute the light ray output distribution of a backlight light guide BL that is corner lit by a light emitting diode 26. FIG. 20 shows the optical elements 5 arranged in a radial type pattern facing a midpoint on one input edge of the substrate 2 to redistribute the light ray output distribution of a backlight light guide BL that is lighted at a midpoint of one input edge of the backlight light guide by a single light emitting diode 26.

FIG. 21 shows an optically transmissive substrate 2 having optical grooves 35 extending across the substrate in a curved pattern facing a corner of the substrate to redistribute the light ray output distribution of a backlight light guide BL that is corner lit by a light emitting diode 26, whereas FIGS. 22-24 show an optically transmissive substrate 2 having a pattern of optical grooves 35 extending across the substrate facing a midpoint along one edge of the substrate that decreases in curvature as the distance from the one edge increases to redistribute the light ray output distribution of a backlight light guide BL that is edge lit by a light emitting diode 26 at a midpoint of one input edge of the backlight light guide.

Where the optically transmissive substrate or film 2 has a pattern 40 of optical elements 5 thereon that varies along the length of the substrate or film, a roll 41 of the substrate or film 2 may be provided having a repeating pattern of optical elements thereon as schematically shown in FIG. 15 to permit a selected area of the pattern that best suits a particular application to be die cut from the roll of substrate or film.

The backlight light guide BL may be substantially flat, or curved, or may be a single layer or multi-layers, and may have different thicknesses and shapes as desired. Moreover, the backlight light guide may be flexible or rigid, and be made of a variety of compounds. Further, the backlight light guide may be hollow, filled with liquid, air, or be solid, and may have holes or ridges. Also, the light source 26 may be of any suitable type including, for example, an arc lamp, an incandescent bulb which may also be colored, filtered or painted, a lens end bulb, a line light, a halogen lamp, a light emitting diode (LED), a chip from an LED, a neon bulb, a cold cathode fluorescent lamp, a fiber optic light pipe transmitting from a remote source, a laser or laser diode, or any other suitable light source. Additionally, the light source 26 may be a multiple colored LED, or a combination of multiple colored radiation sources in order to provide a desired colored or white light output distribution. For example, a plurality of colored lights such as LEDs of different colors (e.g., red, blue, and green) or a single LED with multiple color chips may be employed to create white light or any other colored light output distribution by varying the intensities of each individual colored light.

A pattern of optical deformities or elements may be provided on one or both sides of the backlight light guide BL or on one or more selected areas on one or both sides of the backlight light guide as desired. As used herein, the term optical deformities or optical elements means any change in the shape or geometry of a surface and/or coating or surface treatment that causes a change in the propagation direction of a portion of the light. These optical elements can be produced in a variety of manners, for example, by providing a painted pattern, an etched pattern, machined pattern, a printed pattern, a hot stamp pattern, or a molded pattern or the like on selected areas of the backlight light guide. An ink or print pattern may be applied for example by pad printing, silk printing, inkjet, heat transfer film process or the like. The optical elements may also be printed on a sheet or film which is used to apply the deformities to the backlight light guide. This sheet or film may become a permanent part of the backlight light guide for example by attaching or otherwise positioning the sheet or film against one or both sides of the backlight light guide in order to produce a desired effect.

Coatings that change the incident light characteristics, such as wavelength and color purity, may be used in the present invention. Color conversion thin film materials that can be used to change the wavelength are known. Such color conversion materials include conjugated polymers, fluorescent molecules, phosphorescent molecules, and structures with quantum confinement of excitons, such as quantum dots. Quantum dots are also known to have emission wavelengths that depend on the quantum dot size. Since quantum dots generally contain less than $10^5$ atoms, arrays of quantum dots are generally used to provide a desired effect over macroscopic areas. Color purity refers to the width of the emission spectrum. The emission spectrum can be narrowed by the use of quantum dots or microcavities. Microcavities can be formed by having alternative layers of higher refractive index and lower refractive index dielectric materials to form a DBR (distributed Bragg reflector) stack. These coatings may cover substantially the entire substrate or the coatings may be selective coatings that cover selected regions of the substrate. The coatings may be patterned to form optical elements as discussed above.

By varying the density, opaqueness or translucence, shape, depth, color, area, index of refraction or type of optical elements on or in an area or areas of the backlight light guide, the light output of the backlight light guide can be controlled. The optical elements may be used to control the fraction of light output from a light emitting area of the backlight light guide. For example, fewer and/or smaller size optical elements may be placed on surface areas where less light output is wanted. Conversely, a greater fraction of and/or larger optical elements may be placed on surface areas of the backlight light guide where greater light output is desired.

Varying the percentages and/or size of optical elements in different areas of the backlight light guide is necessary in order to provide a substantially uniform light output distribution. For example, the amount of light traveling through the backlight light guide will ordinarily be greater in areas closer to the light source than in other areas further removed from the light source. A pattern of optical elements may be used to adjust for the light variances within the backlight light guide, for example, by providing a denser concentration of optical elements with increased distance from the light source thereby resulting in a more uniform light output distribution from the backlight light guide.

The optical elements may also be used to control the output ray angle distribution from the backlight light guide to suit a particular application. For example, if the backlight light guide is used to backlight a liquid crystal display, the light output will be more efficient if the pattern of optical elements (or an optically transmissive substrate 2 used in combination with the backlight light guide) directs the light rays emitted by the backlight light guide at predetermined ray angles such that they will pass through the liquid crystal display with low loss. Additionally, the pattern of optical elements may be used to adjust for light output variances attributed to light extractions of the backlight light guide. The pattern of optical elements may be printed on the backlight light guide surface areas utilizing a wide spectrum of paints, inks, coatings, epoxies or the like, ranging from glossy to opaque or both, and may employ half-tone separation techniques to vary the deformity coverage. Moreover, the pattern of optical elements may be multiple layers or vary in index of refraction.

Print patterns of optical elements may vary in shapes such as dots, squares, diamonds, ellipses, stars, random shapes, and the like. Also, print patterns of sixty lines per inch or finer are desirably employed. This makes the deformities or shapes in the print patterns nearly invisible to the human eye in a particular application, thereby eliminating the detection of gradient or banding lines that are common to light extracting patterns utilizing larger elements. Additionally, the optical elements may vary in shape and/or size along the length and/or width of the backlight light guide. Also, a random placement pattern of the optical elements may be utilized throughout the length and/or width of the backlight light guide. The optical elements may have shapes or a pattern with no specific angles to reduce moiré or other interference effects. Examples of methods to create these random patterns are printing a pattern of shapes using stochastic print pattern techniques, frequency modulated half tone patterns, or random dot half tones. Moreover, the optical elements may be colored in order to effect color correction in the backlight light guide. The color of the optical elements may also vary throughout the backlight light guide, for example, to provide different colors for the same or different light output areas.

In addition to or in lieu of the patterns of optical elements, other optical elements including prismatic or lenticular grooves or cross grooves, or depressions or raised surfaces of various shapes using more complex shapes in a mold pattern may be molded, etched, stamped, thermoformed, hot stamped or the like into or on one or more surface areas of the backlight light guide. The prismatic or lenticular surfaces, depressions or raised surfaces will cause a portion of the light rays contacted thereby to be emitted from the backlight light guide. Also, the angles of the prisms, depressions or other surfaces may be varied to direct the light in different directions to produce a desired light output distribution or effect. Moreover, the reflective or refractive surfaces may have shapes or a pattern with no specific angles to reduce moiré or other interference effects.

A back reflector 40 may be attached or positioned against one side of the backlight light guide BL as schematically shown in FIGS. 1 and 2 in order to improve light output efficiency of the backlight light guide by reflecting the light emitted from that side back through the backlight light guide for emission through the opposite side. Additionally, a pattern of optical elements 50 may be provided on one or both sides of the backlight light guide as schematically shown in FIGS. 1 and 2 in order to change the path of the light so that the internal critical angle is exceeded and a portion of the light is emitted from one or both sides of the backlight light guide.

FIGS. 25-28 show optical deformities 50 which may either be individual projections 51 on the respective backlight light guide surface areas 52 or individual depressions 53 in such surface areas. In either case, each of these optical elements 50 has a well defined shape including a reflective or refractive surface 54 that intersects the respective backlight surface area 52 at one edge 55 and has a uniform slope throughout its length for more precisely controlling the emission of light by each of the optical elements. Along a peripheral edge portion 56 of each reflective/refractive surface 54 is an end wall 57 of each optical element 50 that intersects the respective panel surface area 52 at a greater included angle I than the included angle I' between the reflective/refractive surfaces 54 and the panel surface area 52 (see FIGS. 27 and 28) to minimize the projected surface area of the end walls on the panel surface area. This allows more optical elements 50 to be placed on or in the panel surface areas than would otherwise be possible if the projected surface areas of the end walls 57 were substantially the same as or greater than the projected surface areas of the reflective/refractive surfaces 54.

In FIGS. 25 and 26 the peripheral edge portions 56 of the reflective/refractive surfaces 54 and associated end walls 57 are curved in the transverse direction. Also in FIGS. 27 and 28 the end walls 57 of the optical elements 50 are shown extending substantially perpendicular to the reflective/refractive surfaces 54 of the optical elements. Alternatively, such end walls 57 may extend substantially perpendicular to the panel surface areas 52 as schematically shown in FIGS. 29 and 30. This virtually eliminates any projected surface area of the end walls 57 on the panel surface areas 52 whereby the density of the optical elements on the panel surface areas may be even further increased.

Figure 31:
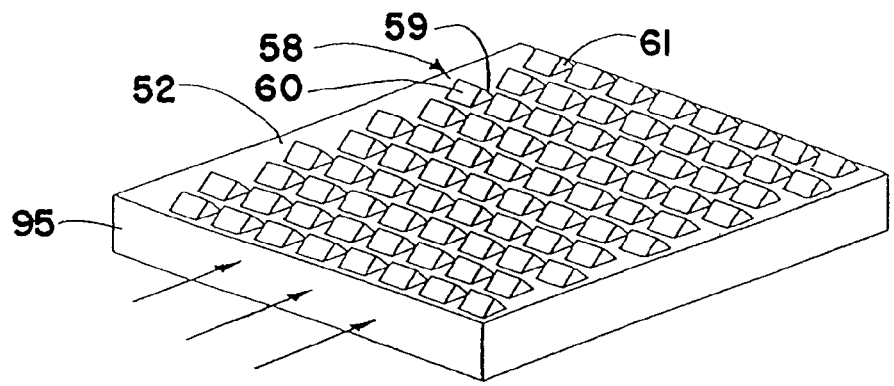
FIGS. 31-39 are enlarged schematic perspective views of surface areas of optically transmissive substrates (including films, sheets, or plates) containing various patterns of individual optical deformities of other well defined shapes.
Figure 32:
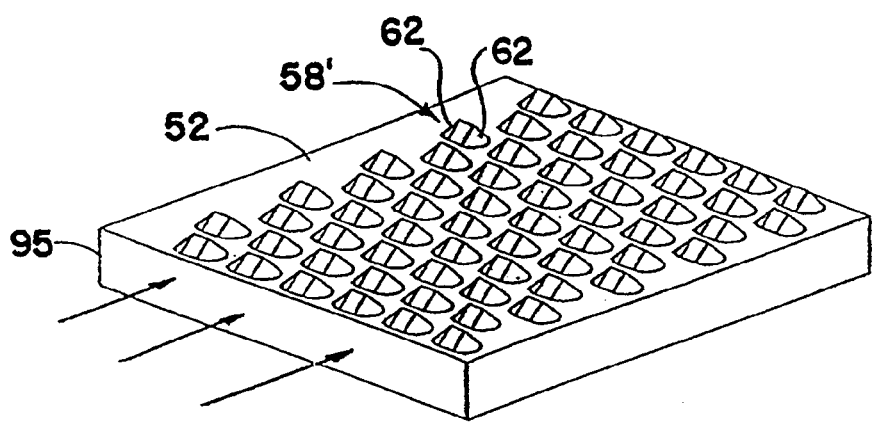

The optical elements may also be of other well defined shapes to obtain a desired light output distribution from a panel surface area. FIG. 31 shows individual light extracting optical elements 58 on a panel surface area 52 each including a generally planar, rectangular reflective/refractive surface 59 and associated end wall 60 of a uniform slope throughout their length and width and generally planar side walls 61. Alternatively, the optical elements 58' may have rounded or curved side walls 62 as schematically shown in FIG. 32.

Figure 33:
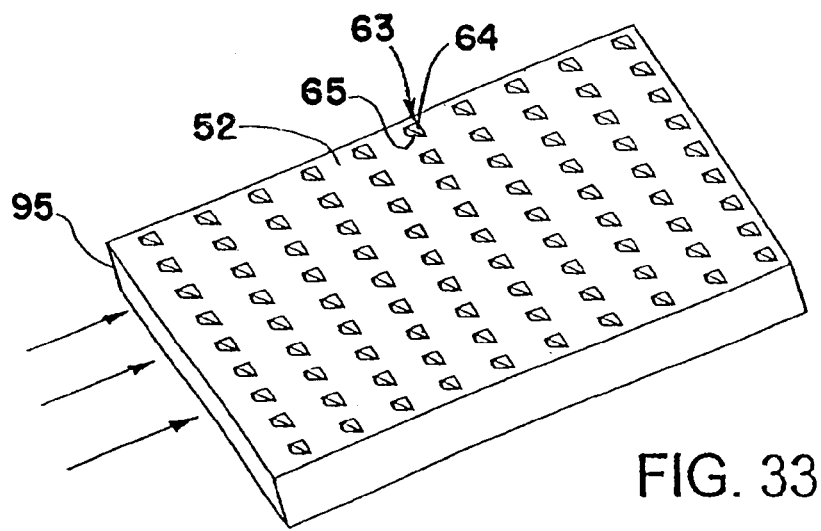
Figure 34:
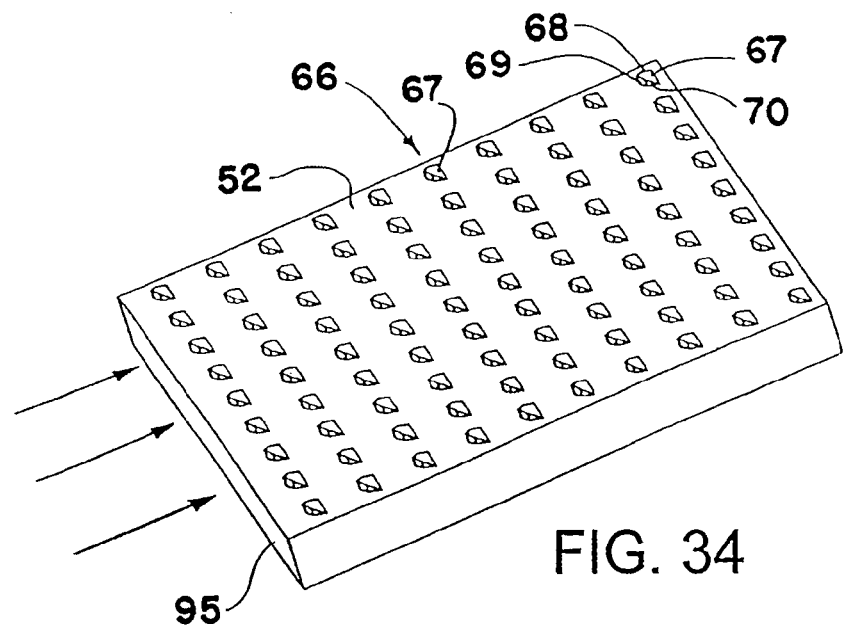

FIG. 33 shows individual light extracting optical elements 63 on a panel surface area 52 each including a planar, sloping triangular shaped reflective/refractive surface 64 and associated planar, generally triangularly shaped side walls or end walls 65. FIG. 34 shows individual light extracting optical elements 66 each including a planar sloping reflective/refractive surface 67 having angled peripheral edge portions 68 and associated angled end and side walls 69 and 70.

Figure 35:
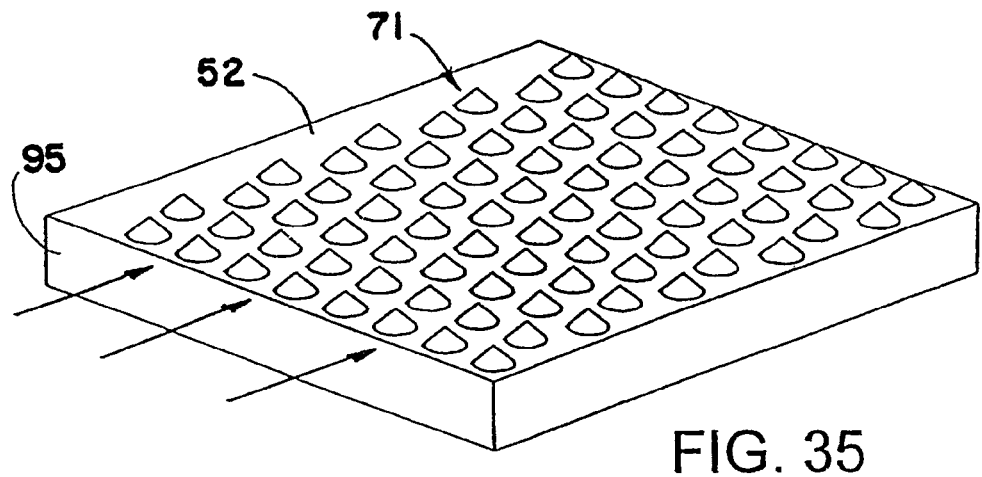
Figure 36:
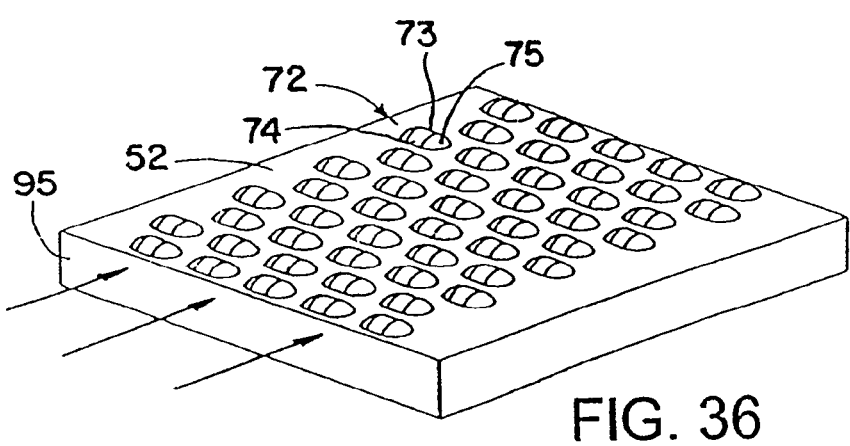

FIG. 35 shows individual light extracting optical elements 71 which are generally conically shaped, whereas FIG. 36 shows individual light extracting optical elements 72 each including a rounded reflective/refractive surface 73 and rounded end walls 74 and rounded or curved side walls 75 all blended together. These additional surfaces will reflect or refract other light rays impinging thereon in different directions to spread light across the backlight light guide or other light emitting panel member BL to provide a more uniform distribution of light emitted from the panel member.

Figure 37:
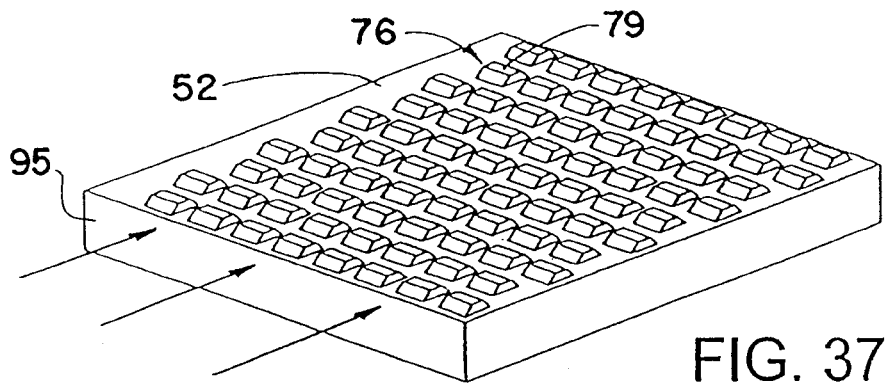
Figure 38:
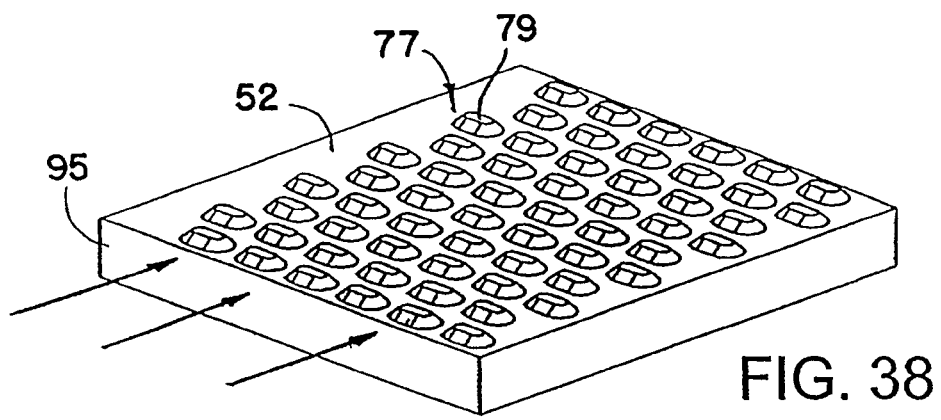
Figure 39:
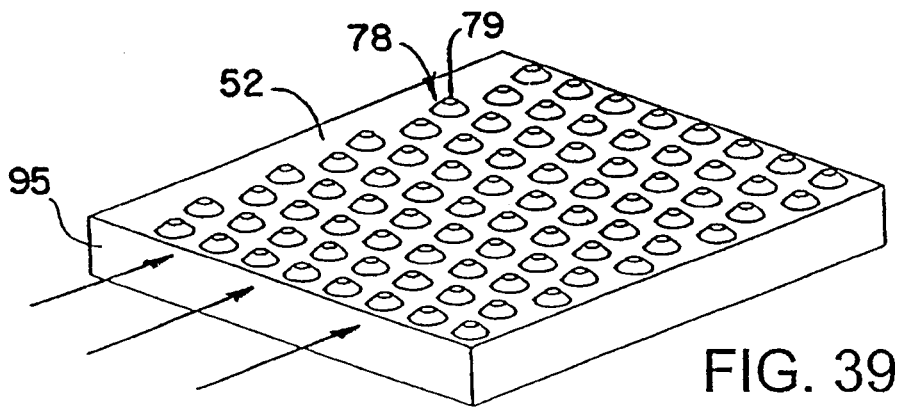
Figure 40:
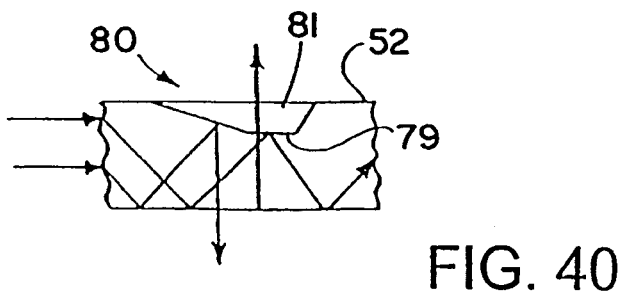
FIG. 40 is an enlarged schematic longitudinal section through another form of optical deformity formed on or in a surface of an optically transmissive substrate (including film, sheet, or plate)

Regardless of the particular shape of the reflective/refractive surfaces and end and side walls of the individual optical elements, such optical elements may also include planar surfaces intersecting the reflective/refractive surfaces and end and/or side walls in parallel spaced relation to the panel surface areas 52. FIGS. 37-39 show optical elements 76, 77 and 78 in the form of individual projections on a panel surface area having representative shapes similar to those shown in FIGS. 31, 32 and 35, respectively, except that each optical element is intersected by a planar surface 79 in parallel spaced relation to the panel surface area 52. In like manner, FIG. 40 shows one of a multitude of optical elements 80 in the form of individual depressions 81 in a panel surface area 52 each intersected by a planar surface 79 in parallel spaced relation to the general planar surface of the panel surface area 52. Any light rays that impinge on such planar surfaces 79 at internal angles less than the critical angle for emission of light from the panel surface area 52 will be internally reflected by the planar surfaces 79, whereas any light rays impinging on such planar surfaces 79 at internal angles greater than the critical angle will be emitted by the planar surfaces with minimal optical discontinuities, as schematically shown in FIG. 40.

Where the optical elements are projections on the panel surface area 52, the reflective/refractive surfaces extend at an angle away from the panel in a direction generally opposite to that in which the light rays from the light source 26 travel through the panel as schematically shown in FIGS. 27 and 29. Where the optical elements are depressions in the panel surface area, the reflective/refractive surfaces extend at an angle into the panel in the same general direction in which the light rays from the light source 26 travel through the panel member as schematically shown in FIGS. 28 and 30.

Figure 41:
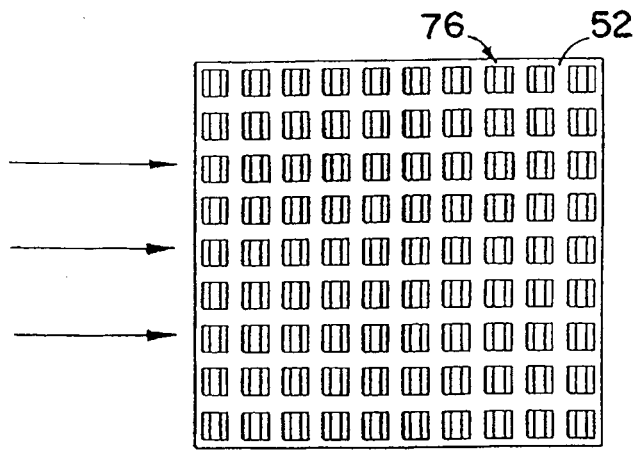
FIGS. 41 and 42 are enlarged schematic top plan views of optically transmissive substrate (including film, sheet, or plate) surface areas containing optical deformities similar in shape to those shown in FIGS. 37 and 38 arranged in a plurality of straight rows along the length and width of the surface areas.
Figure 42:
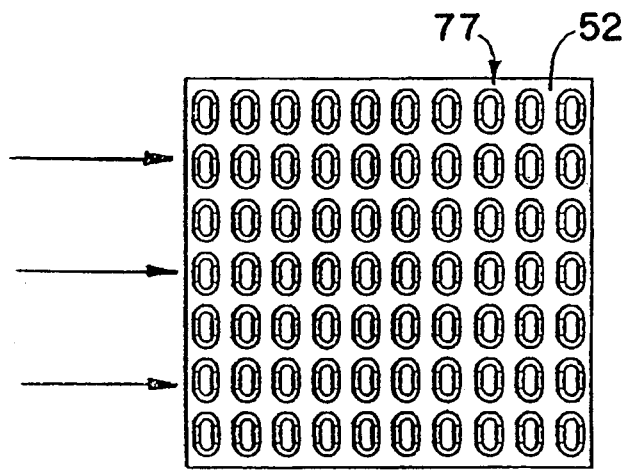
Figure 43:
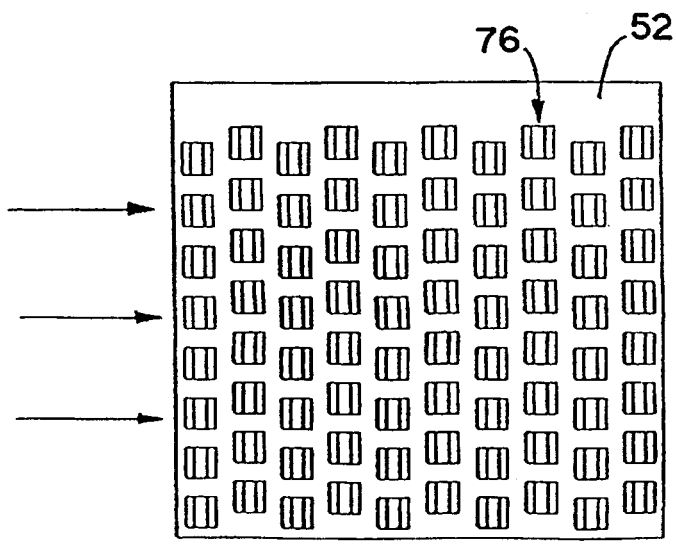
FIGS. 43 and 44 are enlarged schematic top plan views of optically transmissive substrate (including film, sheet, or plate) surface areas containing optical deformities also similar in shape to those shown in FIGS. 37 and 38 arranged in staggered rows along the length of the surface areas.
Figure 44:
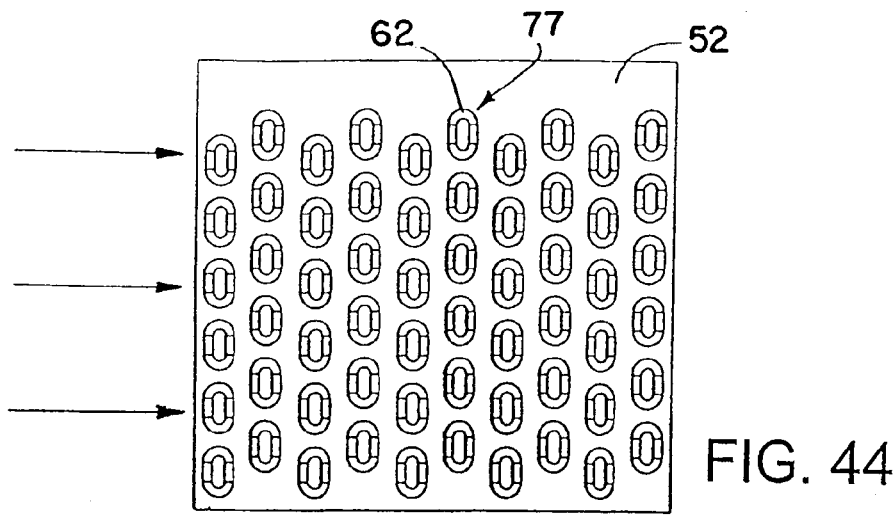

Regardless of whether the optical elements are projections or depressions on or in the panel surface areas 52, the slopes of the light reflective/refractive surfaces of the optical elements may be varied to cause the light rays impinging thereon to be either refracted out of the light emitting panel or reflected back through the panel and emitted out the opposite side of the panel which may be etched to diffuse the light emitted therefrom or covered by an optically transmissive substrate 2 to produce a desired effect. Also, the pattern of optical elements on the panel surface area may be uniform or variable as desired to obtain a desired light output distribution from the panel surface areas. FIGS. 41 and 42 show optical elements 76 and 77 similar in shape to those shown in FIGS. 37 and 38 arranged in a plurality of generally straight uniformly spaced apart rows along the length and width of a panel surface area 52, whereas FIGS. 43 and 44 show such optical elements 76 and 77 arranged in staggered rows that overlap each other along the length of a panel surface area.

Figure 45:
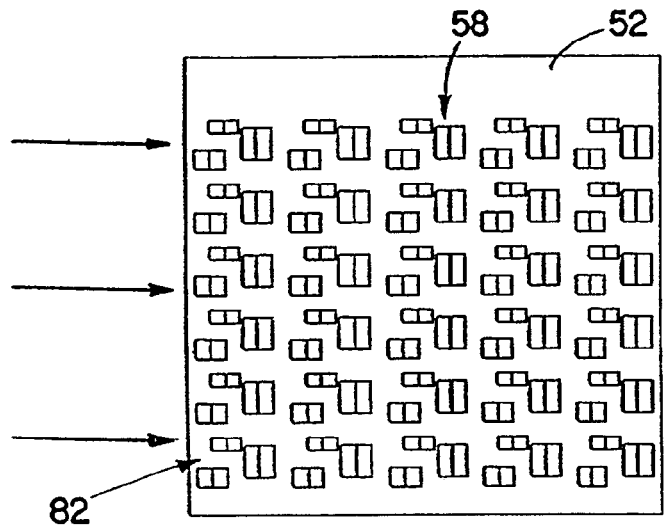
FIGS. 45 and 46 are enlarged schematic top plan views of optically transmissive substrate (including film, sheet, or plate) surface areas containing a random or variable pattern of different sized optical deformities on or in the surface areas.
Figure 46:
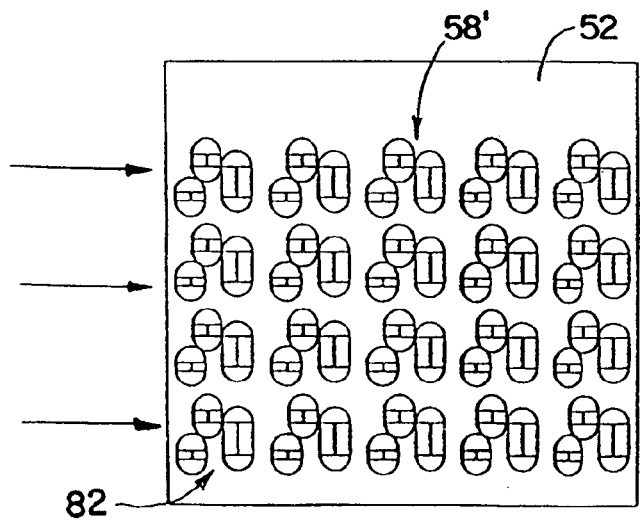
Figure 47:
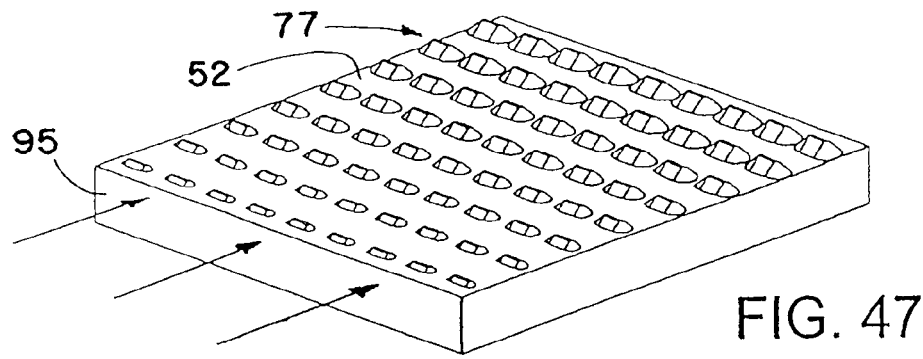
FIG. 47 is an enlarged schematic perspective view of an optically transmissive substrate (including film, sheet, or plate) surface area showing optical deformities increasing in size as the distance of the deformities from the light input surface increases or intensity of the light increases along the length of the surface area.

Also, the size, including the width, length and depth or height as well as the angular orientation and position of the optical elements may vary along the length and/or width of any given panel surface area to obtain a desired light output distribution from the panel surface area. FIGS. 45 and 46 show a random or variable pattern of different size optical elements 58 and 58' similar in shape to those shown in FIGS. 31 and 32, respectively, arranged in staggered rows on a panel surface area 52, whereas FIG. 47 shows optical elements 77 similar in shape to those shown in FIG. 38 increasing in size as the distance of the optical elements from the light source increases or intensity of the light decreases along the length and/or width of the panel surface area. The optical elements 58 and 58' are shown in FIGS. 45 and 46 arranged in clusters 82 across the panel surface, with at least some of the optical elements in each cluster having a different size or shape characteristic that collectively produce an average size or shape characteristic for each of the clusters that varies across the panel surface. For example, at least some of the optical elements in each of the clusters may have a different depth or height or different slope or orientation that collectively produce an average depth or height characteristic or average slope or orientation of the sloping surface that varies across the panel surface. Likewise at least some of the optical elements in each of the clusters may have a different width or length that collectively produce an average width or length characteristic that varies across the panel surface. This allows one to obtain a desired size or shape characteristic beyond machinery tolerances, and also defeats moiré and interference effects.

Figure 48:
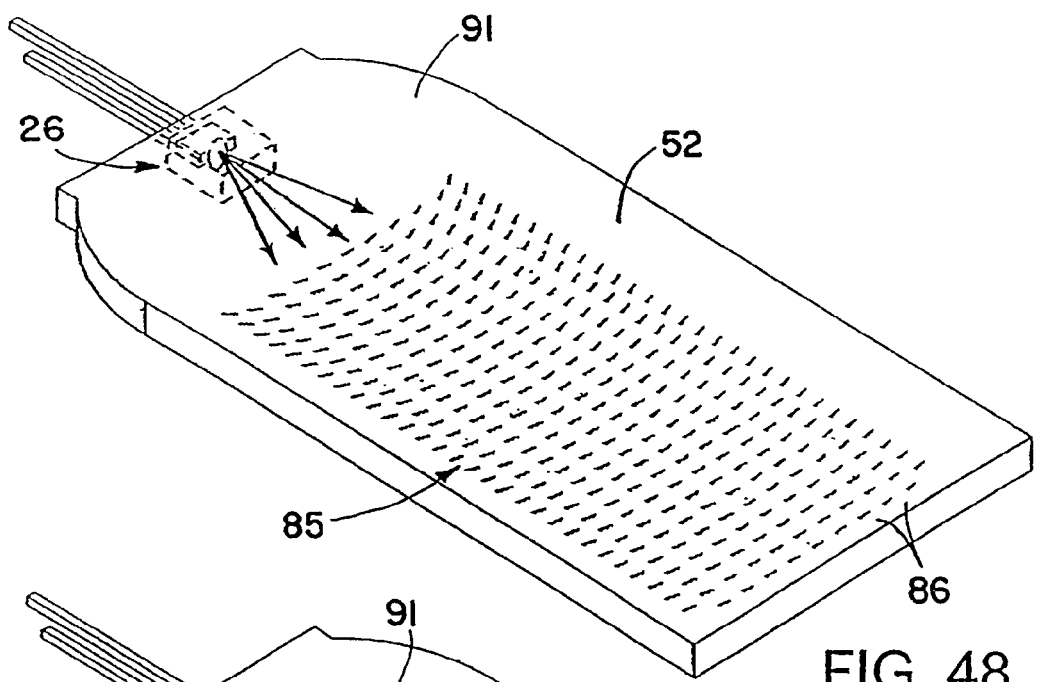
FIGS. 48 and 49 are schematic perspective views showing different angular orientations of the optical deformities along the length and width of an optically transmissive substrate (including film, sheet, or plate) surface area.
Figure 49:
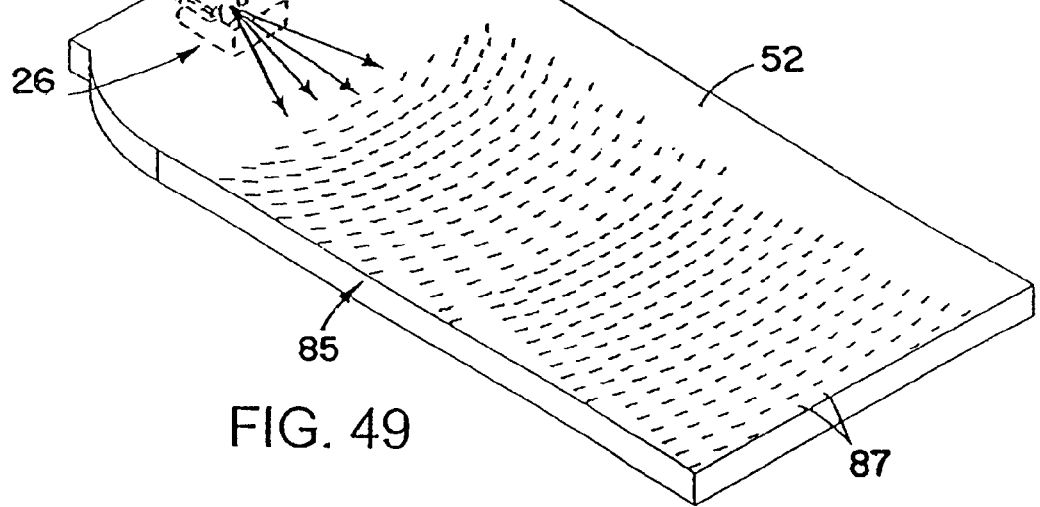

FIGS. 48 and 49 schematically show different angular orientations of optical elements 85 of any desired shape along the length and width of a panel surface area 52. In FIG. 48 the optical elements are arranged in straight rows 86 along the length of the panel surface area but the optical elements in each of the rows are oriented to face the light source 26 so that all of the optical elements are substantially in line with the light rays being emitted from the light source. In FIG. 49 the optical elements 85 are also oriented to face the light source 26 similar to FIG. 48. In addition, the rows 87 of optical elements in FIG. 49 are in substantial radial alignment with the light source 26.

Figure 50:
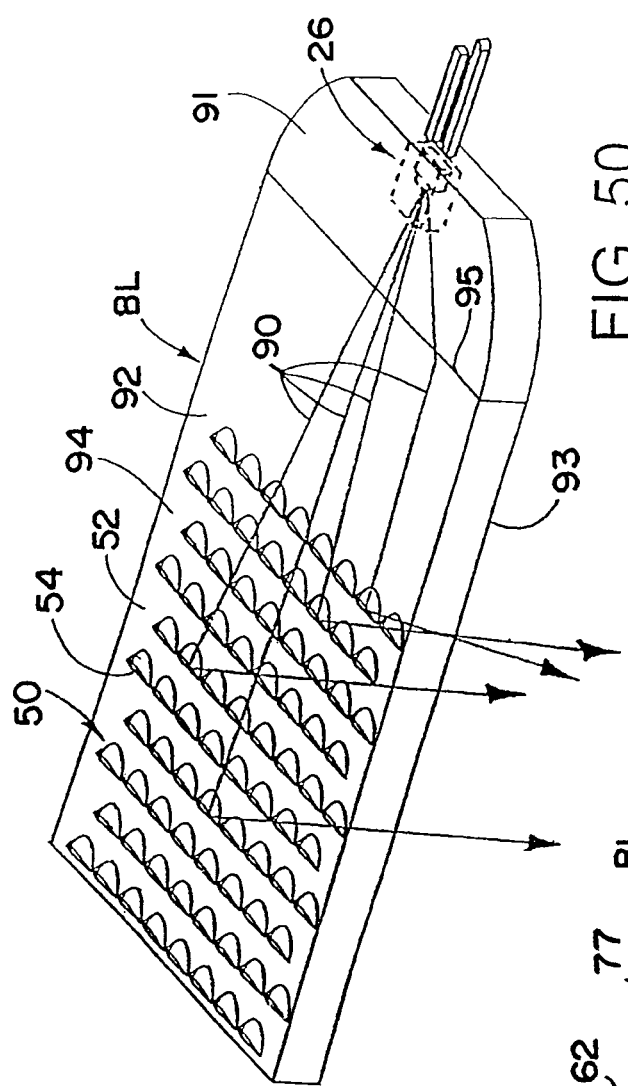
FIGS. 50 and 51 are enlarged perspective views schematically showing how exemplary light rays emitted from a focused light source are reflected or refracted by different individual optical deformities of well defined shapes of an optically transmissive substrate (including film, sheet, or plate) surface area.
Figure 51:
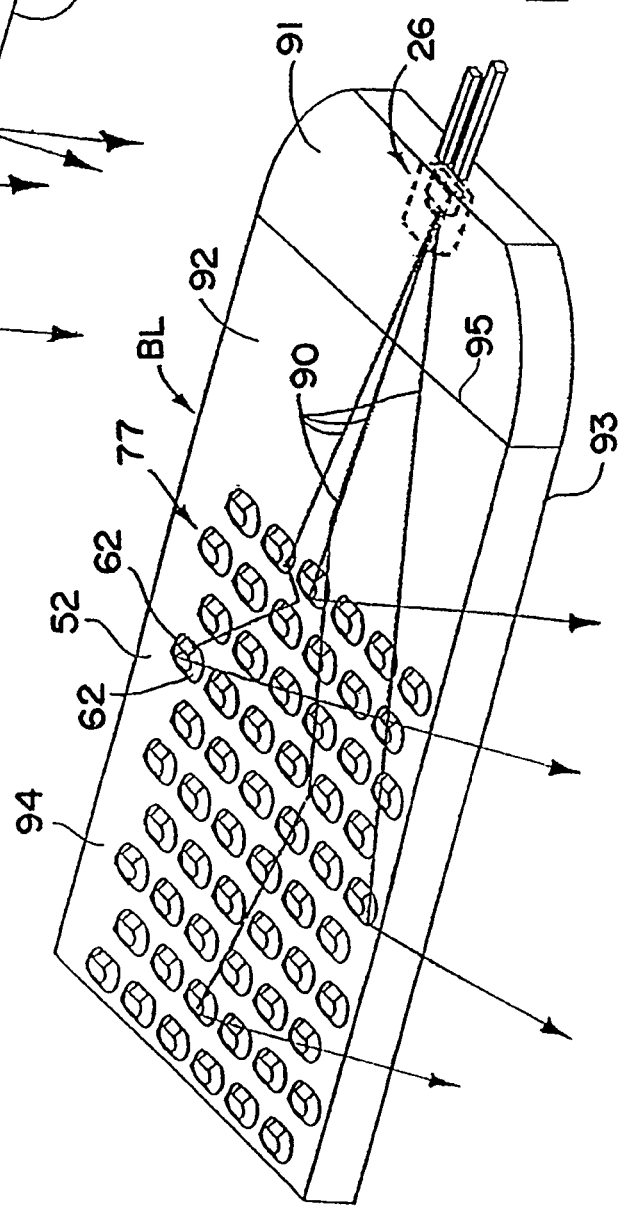

FIGS. 50 and 51 schematically show how exemplary light rays 90 emitted from a focused light source 26 insert molded or cast within a light transition area 91 of a backlight light guide BL in accordance with this invention are reflected during their travel through the light emitting panel member 92 until they impinge upon individual light extracting optical elements 50, 77 of well defined shapes on or in a panel surface area 52 causing more of the light rays to be reflected or refracted out of one side 93 of the panel member than the other side 94. In FIG. 50 the exemplary light rays 90 are shown being reflected by the reflective/refractive surfaces 54 of the optical elements 50 in the same general direction out through the same side 93 of the panel member, whereas in FIG. 51 the light rays 90 are shown being scattered in different directions within the panel member 92 by the rounded side walls 62 of the optical elements 77 before the light rays are reflected/refracted out of the same side 93 of the panel member. Such a pattern of individual light extracting optical elements of well defined shapes in accordance with the present invention can cause 60 to 70% or more of the light received through the input edge 95 of the panel member to be emitted from the same side of the panel member.

From the foregoing, it will be apparent that the optically transmissive substrates of the present invention redistribute more of the light emitted by a backlight light guide or other light source toward a direction more normal to the plane of the substrates. Also, the optically transmissive substrates and backlight light guides of the present invention may be tailored or tuned to each other to provide a system in which the individual optical elements of the optically transmissive substrates work in conjunction with the optical elements of the backlight light guides to produce an optimized output light ray angle distribution from the system.

As previously discussed, the optical elements on or in one or more surfaces of the light redirecting films, backlight light guides or other optically transmissive substrates (including sheets, films, or plates) may be individual three-dimensional optical elements of well defined shape each having a length and width that is substantially smaller than the overall length and width of the surface or surfaces of the substrates containing the optical elements. When larger patterns of these individual optical elements are desired on or in one or more surfaces of the substrates, one known method of fabricating larger patterns of such optical element shapes is to tile together multiple copies of a master having the desired pattern of optical element shapes formed therein to produce a larger pattern of the optical element shapes on or in the substrates. This substantially cuts down on the machining time required to make a master having a larger pattern of the optical element shapes therein.

In the case of non-overlapping optical element shapes or optical element shapes that overlap in a regular pattern, it is relatively easy to align the edges of multiple copies of a master so that substantially no disruptions in the pattern of optical element shapes is evident in the larger pattern upon tiling the copies together. However, when a pattern of overlapping, intersecting or interlocking optical element shapes are provided in the master that are substantially random in position, size, rotation, shape, etc., the edges of multiple copies of the master will normally align in a fashion that causes substantial discontinuities in the optical element shapes along the edges and hence the pattern at large.

Figure 52:
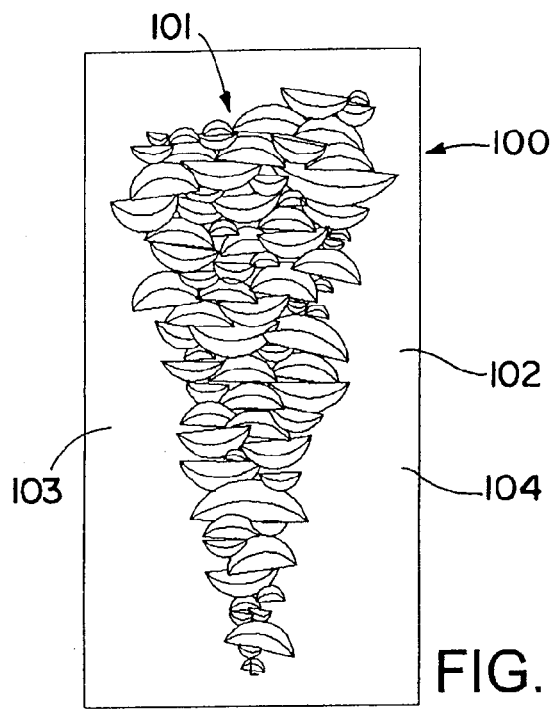
FIG. 52 is a schematic plan view of an initial master having a substantially random radial pattern of overlapping optical element shapes generated using standard patterning methods.
Figure 53:
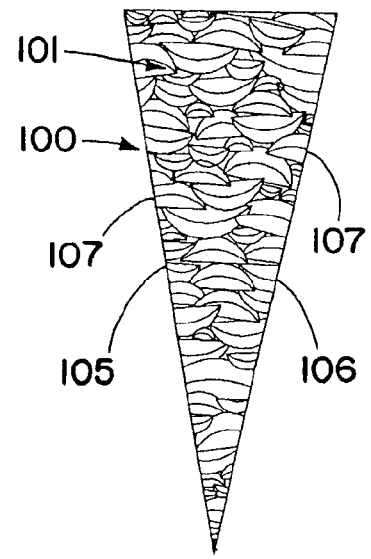
FIG. 53 is a schematic plan view of a final master formed by cutting or trimming the initial master of FIG. 52.
Figure 54:
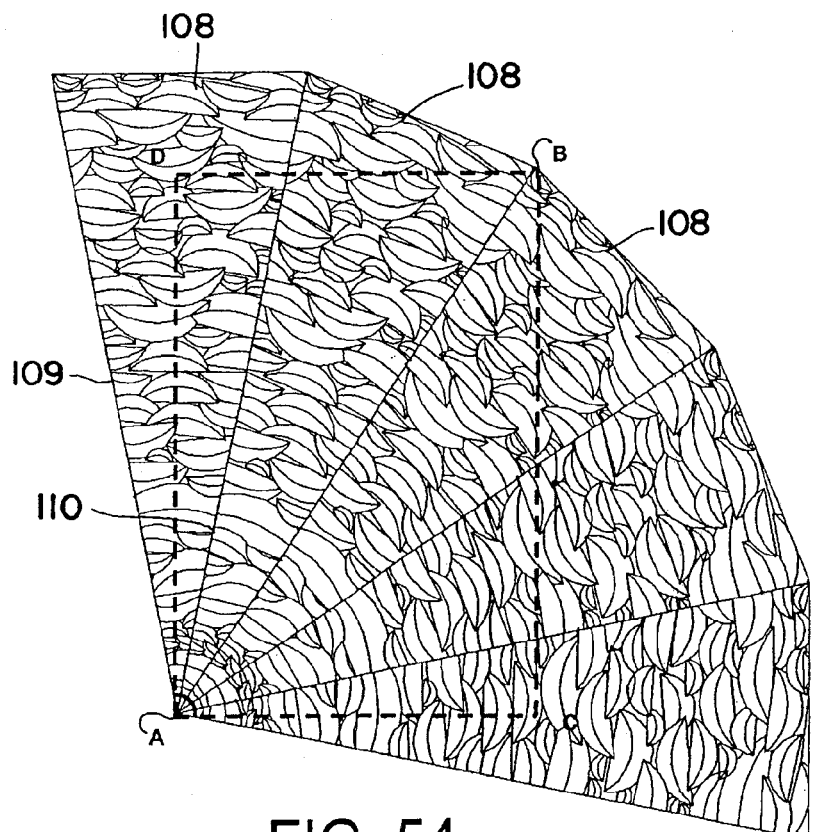
FIG. 54 is a schematic plan view of multiple copies of the final master of FIG. 53 tiled together along their radial side edges which produces substantial discontinuities in the optical element shapes along the seams.
Figure 55:
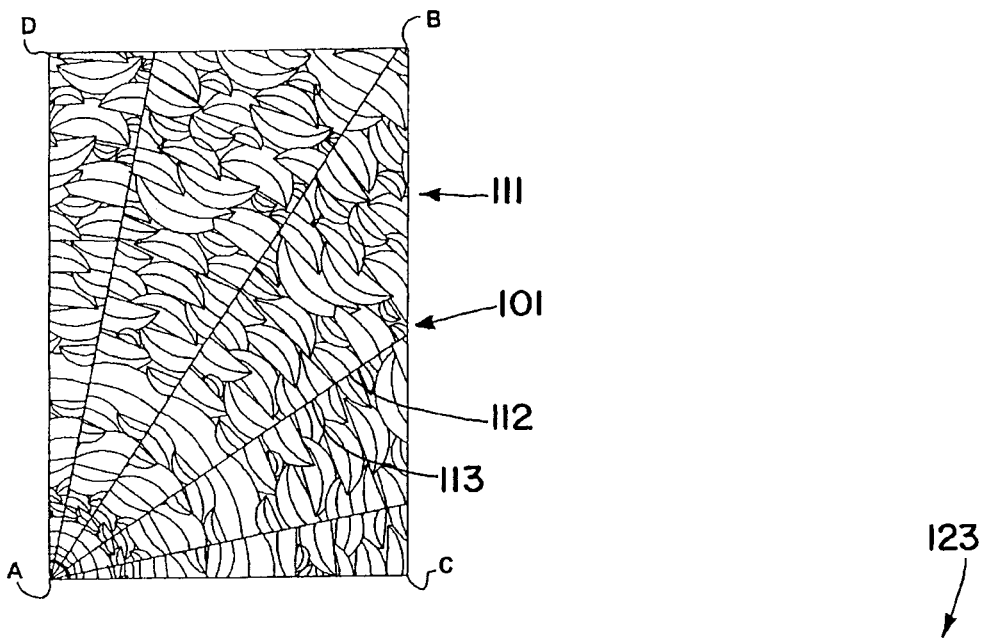
FIG. 55 is a schematic plan view of a larger pattern of optical element shapes cut out of the tiled copies of FIG. 54 which also has substantial discontinuities in the optical element shapes along the seams.

FIG. 52 shows a master 100 made for example from an easily machinable metal such as aluminum, nickel (including nickel alloys), copper, brass, etc. having a substantially random radial pattern of overlapping, intersecting or interlocking optical element shapes 101 that are formed as by cutting, milling, grinding, scribing or otherwise forming the optical element shapes in a surface 102 of the master using standard patterning methods. If two or more side edges 103, 104 of the master 100 are cut or trimmed to provide respective edges 105, 106 that have at least some partial optical element shapes 107 along the edges as shown in FIG. 53, and copies 108 of the master 100 are tiled together along their edges 109 and 110 as shown in FIG. 54, a larger pattern 111 having for example corners A, B, C, D that is removed from the tiled copies 108 of the master will have substantial discontinuities 112 in the optical element shapes 101 along the seams 113 and hence in the pattern 111 at large as shown in FIG. 55.

These discontinuities 112 in the optical element shapes 101 along the seams 113 may be minimized in accordance with the present invention by making a master having a pattern of overlapping, intersecting or interlocking optical element shapes that are substantially random except along at least one edge where the optical element shapes substantially match the optical element shapes along another edge.

For example, in a larger pattern comprised of multiple copies of a triangular shaped master having a pattern of overlapping, intersecting or interlocking optical element shapes, the optical element shapes may be substantially random except along one radial side edge of the master where the optical element shapes are made substantially to match those along the other radial side edge so the optical element shapes along the radial side edges can be aligned to form the larger pattern with minimal discontinuities in the optical element shapes along the aligned radial side edges.

Figure 56:
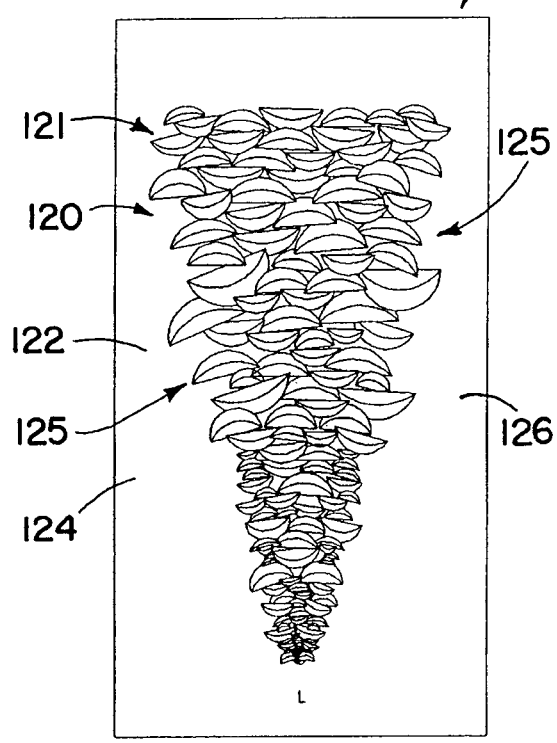
FIG. 56 is a schematic plan view of an initial master according to the present invention having a radial pattern of overlapping, intersecting or interlocking optical element shapes that are substantially random except along one side where the optical element shapes are constrained to be substantially identical to those along an other side.
Figure 57:
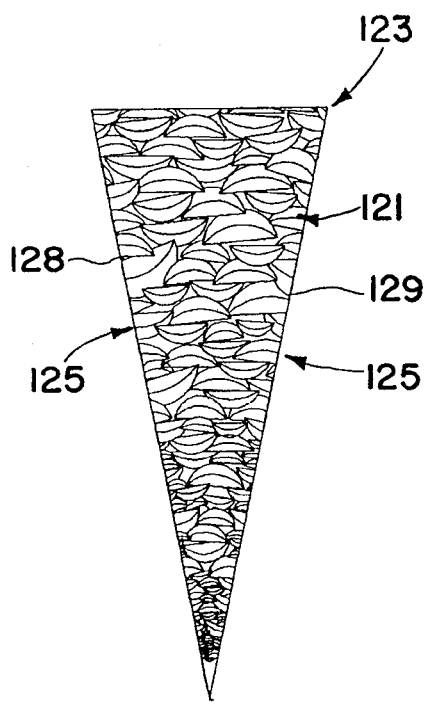
FIG. 57 is a schematic plan view of a final master of the present invention formed by cutting or trimming the initial master of FIG. 56 so that the optical element shapes along the radial side edges substantially match one another.
Figure 58:
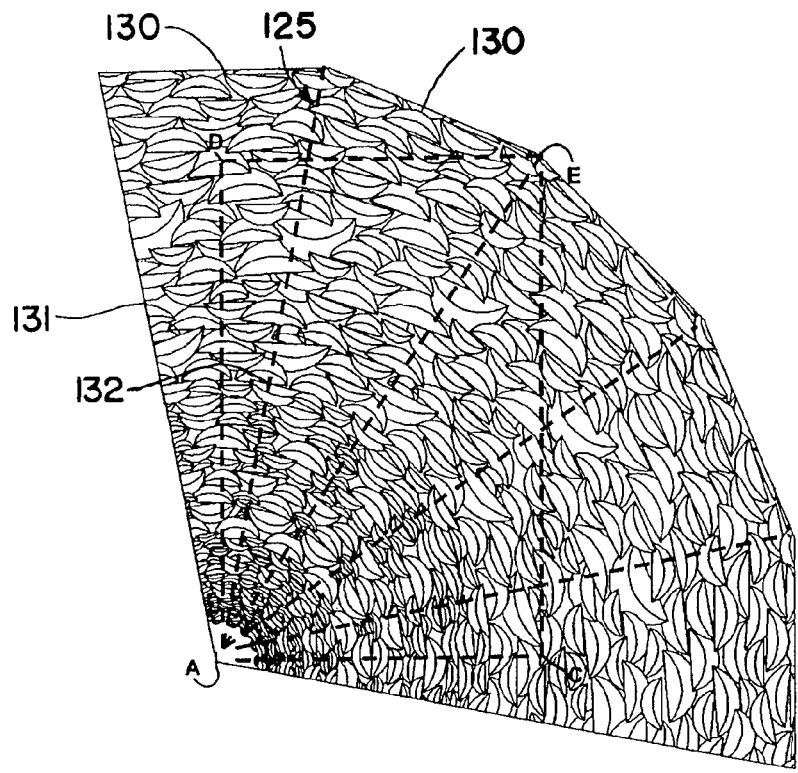
FIG. 58 is a schematic plan view of multiple copies of the master of FIG. 57 tiled together with the optical element shapes along the radial side edges substantially aligned with one another to form a substantially seamless transition between the copies.
Figure 59:
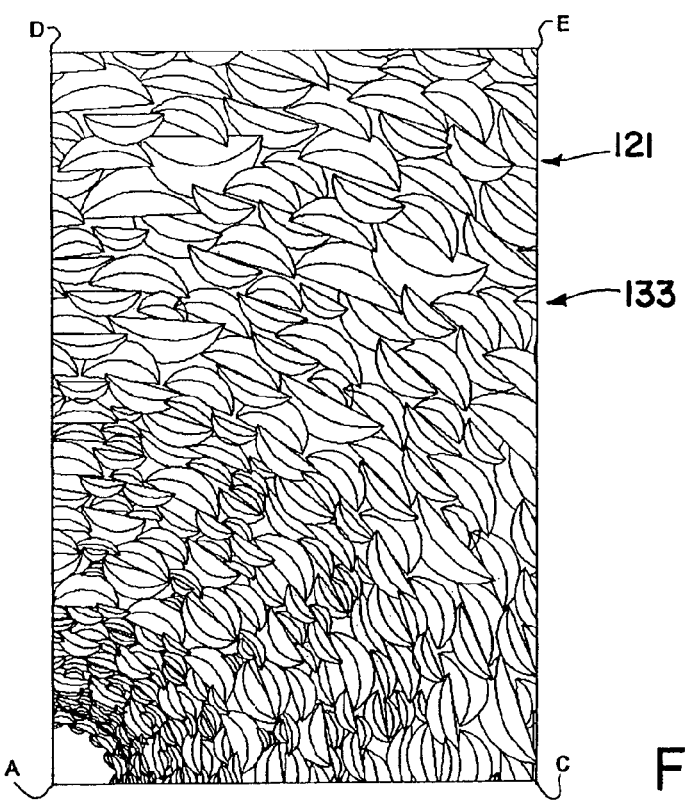
FIG. 59 is a schematic plan view of a larger substantially random pattern of overlapping, intersecting or interlocking optical element shapes formed from the tiled copies of FIG. 58.

FIG. 56 shows one such radial pattern 120 of overlapping, intersecting or interlocking optical element shapes 121 on a surface 122 of a master 123 that are substantially random except along one of the side edges 124 where the optical element shapes 125 are constrained to be substantially identical in placement and form to those along another radial side edge 126. Accordingly, the radial side edges 128 and 129 of the master 123 may be formed by cutting or trimming the respective side edges 124 and 126 so that the optical element shapes 125 along the radial side edges 128 and 129 substantially match one another as shown in FIG. 57. This permits multiple first or second generation copies 130 of the master 123 to be tiled together with the substantially matching optical element shapes 125 along their radial side edges 131 and 132 substantially aligned with one another to form a substantially seamless transition between the copies with minimal discontinuities in the optical element shapes along the aligned radial side edges as shown in FIG. 58. A larger substantially seamless pattern 133 of overlapping, intersecting or interlocking optical element shapes 121 having for example corners A, C, D, E may then be removed from the tiled copies of FIG. 58 as shown in FIG. 59 for use in making a substantially random pattern of overlapping, intersecting or interlocking optical elements on or in an optically transmissive substrate that are quite small in relation to the width and length of the substrate as described hereafter.

In like manner, multiple substantially rectangular copies of a master having a pattern of overlapping, intersecting or interlocking optical element shapes that are substantially random except along one or more edges where the optical element shapes may be made to substantially match those along one or more other edges so the optical element shapes along the edges may be aligned to form a larger pattern substantially without any discontinuities in the optical element shapes along the aligned edges.

Figure 60:
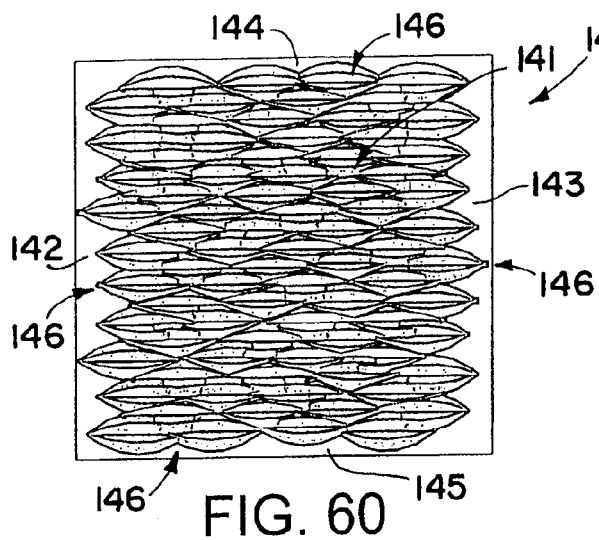
FIG. 60 is a schematic plan view of an initial master according to the present invention having a substantially rectangular pattern of overlapping, intersecting or interlocking optical element shapes that are substantially random except along one side and along one of the top and bottom sides where the optical element shapes are constrained to be substantially identical in shape and form to those along the other side and along the other of the top and bottom sides.
Figure 61:
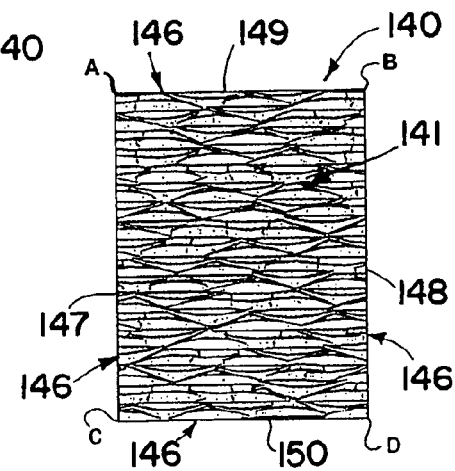
FIG. 61 is a schematic plan view of a substantially rectangular final master of the present invention formed by cutting or trimming the initial master of FIG. 60 so that the optical element shapes along the side edges and top and bottom edges substantially match one another.
Figure 62:
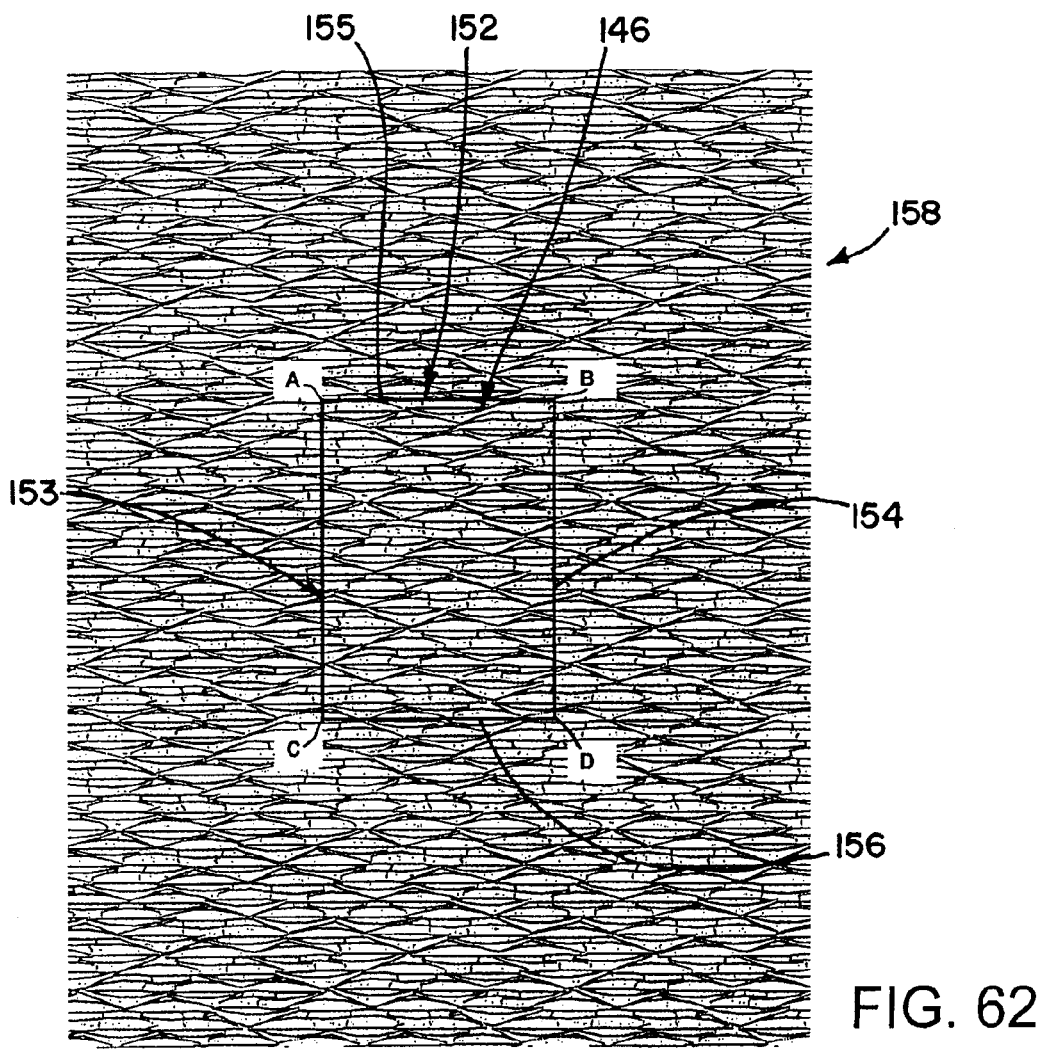
FIG. 62 is a schematic plan view of multiple copies of the master of FIG. 61 tiled together with the optical element shapes along the side edges and top and bottom edges aligned with one another to form a substantially seamless transition between the copies.

FIG. 60 shows one such rectangular shaped master 140 having a pattern of overlapping, intersecting or interlocking optical element shapes 141 that are substantially random except along one of the side edges 142 and 143 and along one of the top and bottom edges 144 and 145 where the optical element shapes 146 are constrained to be substantially identical in placement and form to the optical element shapes 146 along the other side edge 142 or 143 and the other of the top and bottom edges 144 and 145. This allows the side edges 147 and 148 and top and bottom edges 149 and 150 to be formed by cutting or trimming the respective side edges 142 and 143 and top and bottom edges 144 and 145 so that the optical element shapes 146 along the side edges 147 and 148 and top and bottom edges 149 and 150 to match one another as shown in FIG. 61. Accordingly, when multiple first or second generation copies 152 of the rectangular master 140 of FIG. 61 having for example corners A, B, C, D are tiled together with the optical element shapes 146 along the side edges 153 and 154 and top and bottom edges 155 and 156 aligned with one another, a larger rectangular pattern 158 will be produced with minimal discontinuities in the optical element shapes between the copies as shown in FIG. 62.

Similarly, a larger substantially random pattern of overlapping, intersecting or interlocking optical element shapes may be formed by tiling copies of a master strip arranged side by side. In this case, the optical element shapes on the master strip need only be constrained to match one another on the side edges or on the top and bottom edges.

Figure 63:
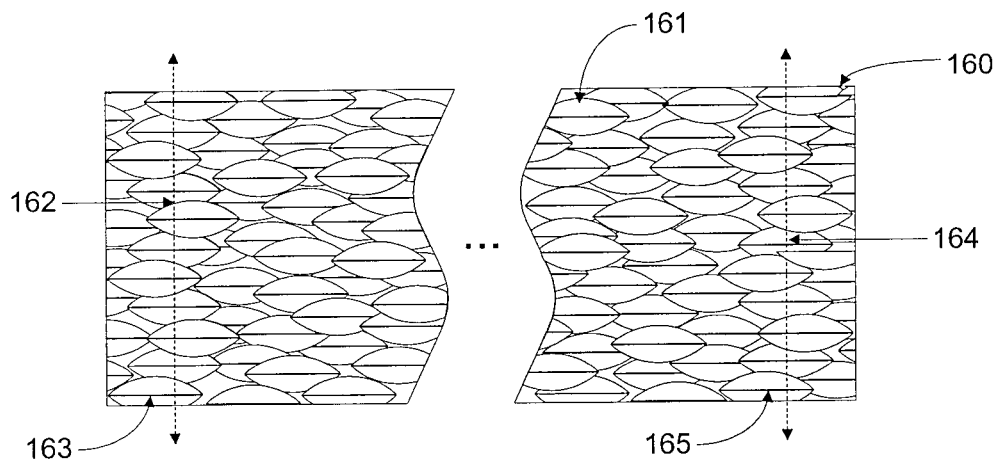
FIG. 63 is a schematic fragmentary plan view of an initial master strip according to the present invention having a pattern of overlapping, intersecting or interlocking optical element shapes that are substantially random except along one side where the optical element shapes are constrained to be substantially identical to those along the other side.
Figure 64:
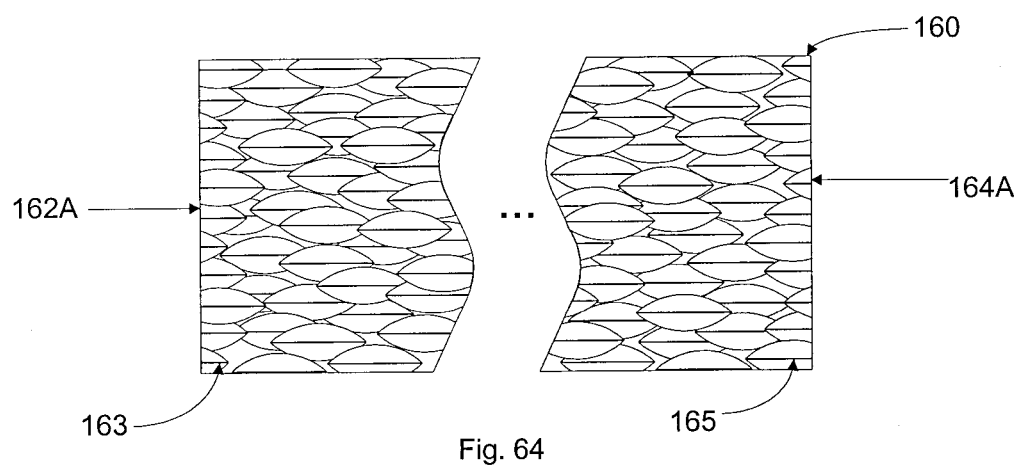
FIG. 64 is a schematic fragmentary plan view of a final master strip of the present invention formed by cutting or trimming the initial master strip of FIG. 63 so that the optical element shapes along the side edges substantially match one another.
Figure 65:
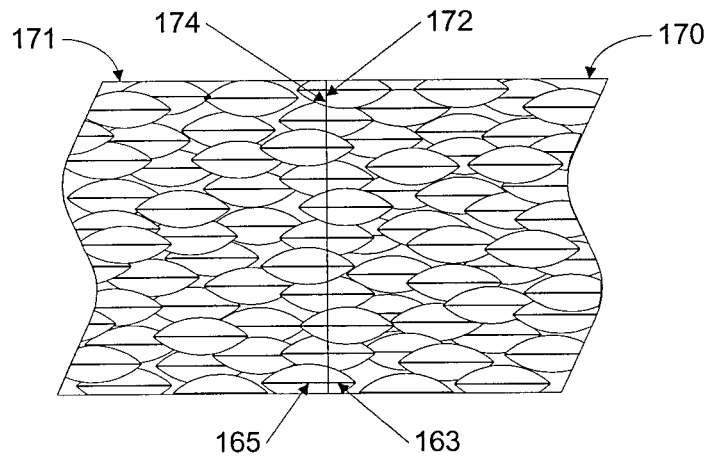
FIG. 65 is a schematic fragmentary plan view of multiple copies of the master strip of FIG. 64 tiled together with the optical element shapes along the side edges substantially aligned with one another to form a substantially seamless transition between the copies.

FIG. 63 shows a portion of a master strip 160 having a pattern of optical element shapes 161 that may be substantially random except along one of the side edge regions 162 (or along one of the top and bottom edge regions) where the optical element shapes 163 are constrained to be identical in placement and form to the optical element shapes 165 along the other side edge region 164 (or along the other of the top and bottom edge regions). This allows the side edges 162A and 164A (or top and bottom edges) to be formed by cutting or trimming the respective side edge regions 162 and 164 (or top and bottom edge regions) so that the optical element shapes 163 and 165 along the side edges 162A and 164A (or along the top and bottom edges) substantially match one another as shown in FIG. 64. Thus when a plurality of first or second generation copies 170 of the master strip 160 of FIG. 64 are tiled together with the matching optical element shapes 163 and 165 along the side edges 172 and 174 (or along the top and bottom edges) aligned with one another, a seamless transition will be formed between the copies with minimal discontinuities in the optical element shapes along the side edges as shown in FIG. 65.

The optical element shapes may cover substantially an entire surface area of at least the portion of the master containing the pattern as shown in FIGS. 56 and 57, FIGS. 60 and 61 and FIGS. 63 and 64. Also, the master may be made in a flat substrate, a curved substrate, or a roll. Further, the master may be made without having to cut or trim the side edges (or top and bottom edges) of the master by forming at least some partial optical element shapes along the side edges (or top and bottom edges) of the master which when aligned provide minimal discontinuities in the optical element shapes along the edges. However, it is generally easier to constrain the optical element shapes along the side edges and/or the top and bottom edges of the master to be identical with each other in placement and form and then cut or trim the side edges and/or top and bottom edges so that the optical element shapes along the respective edges match one another.

Figure 66:
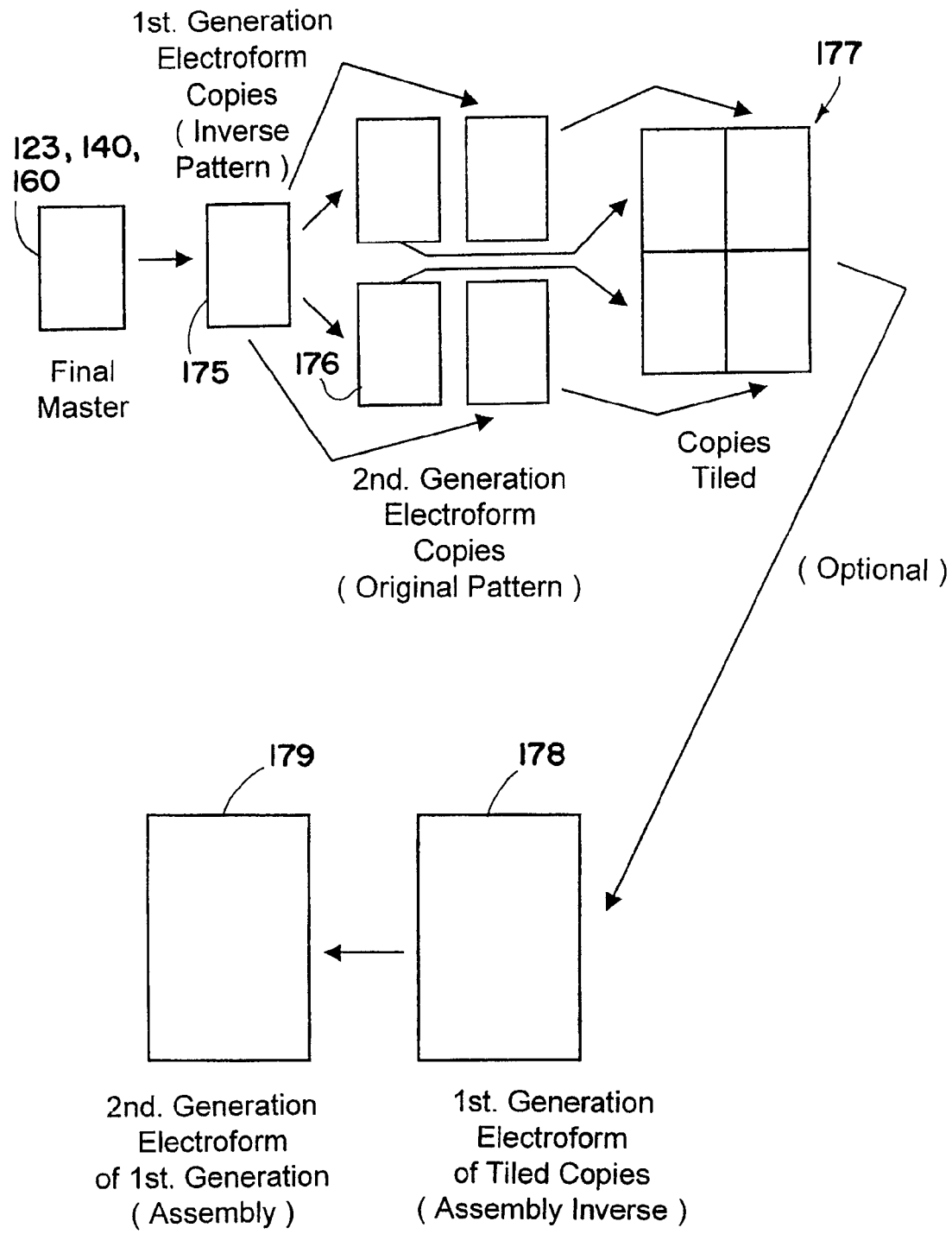
FIG. 66 is a schematic diagram illustrating different methods of producing a larger substantially seamless pattern of overlapping random optical element shapes from masters made according to the present invention.

FIG. 66 schematically shows first generation copies 175 of any of the masters 123, 140 or 160 of the present invention which may be made as by depositing a suitable metal such as nickel or a nickel alloy onto the masters as by an electroforming or chemical vapor deposition process and removing the copies from the masters. Alternatively, the copies may be made from the masters by a molding process, a hot press process, or an embossing process. For example, the copies may be made by heating and pressing copy material against the optical element shapes in the masters, or by applying a flowable material over the optical element shapes in the masters, and after the flowable material cures or solidifies, removing the cured or solidified material from the masters. The flowable material, if used, may be a self-curing material, a heat cured material, or an ultraviolet or radiant cured material as desired. Furthermore, substrates including sheets, films, and plates can be made by an extrusion process. After the extrusion process, the substrate may be heated until it is plastic and then may be thermoformed, whereby it is formed on a mold into a new shape. Continuous roll-to-roll processes are possible in addition to discrete processing of individual substrates.

The first generation copies 175 or second generation copies 176 made from the first generation copies may then be tiled together as further schematically shown in FIG. 66 using known tiling techniques. The optical element shapes (not shown) in the tiled copies 177 or in a first or second generation pattern 178 or 179 made from the tiled copies may then be transferred to one or more surfaces of a light redirecting film or other optically transmissive substrate as by a deposition process, a molding process, a hot press process, an embossing process, an extrusion process, or a thermoforming process as well known in the art.

Figure 67:
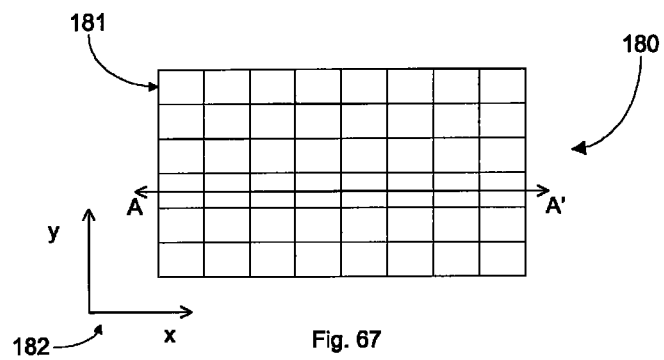
FIG. 67 is a schematic top plan view of a light emitting assembly in accordance with the present invention.

FIG. 67 is a schematic top plan view of a light emitting assembly 180 for a 37 inch class liquid crystal display (LCD) high definition TV in accordance with the present invention. For ease of reference, an x-y coordinate system 182 is also shown. Light emitting assembly 180 has a viewable area of approximately 81.9 cm (x-direction) by 46.1 cm (y-direction), and has 48 light emitting modules 181. Each light emitting module 181 has a viewable area of approximately 10.24 cm (x-direction) by 7.68 cm (y-direction), i.e. has an aspect ratio of 4:3. Light emitting assembly 180 comprises LED(s), optically transmissive substrate(s) including a pattern of optical elements, and if needed, other optical films or substrates such as reflectors, diffusers, and lenticular prismatic films. These dimensions are for illustrative purposes only, and other sizes and aspect ratios for assemblies and modules are also possible.

Figures 68A, 68B:
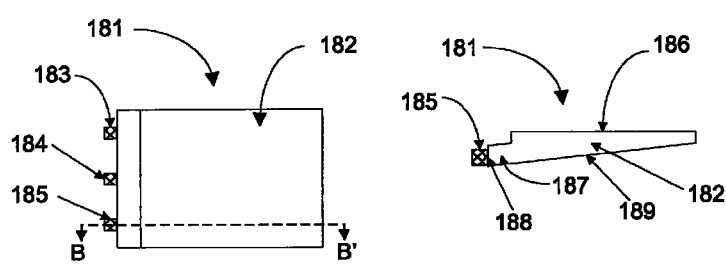
FIGS. 68A and 68B are schematic top plan and side cross sectional views, respectively, of a light emitting module in accordance with the present invention.

FIG. 68A is a schematic top plan view of light emitting module 181 in greater detail. FIG. 68B is a schematic cross sectional view of the same light emitting module 181, taken along line B-B' of FIG. 68A. Light emitting module 181 includes LEDs 183, 184, and 185, which are attached to the light input surface 188 of the optically transmissive substrate 182. A pattern of light extracting optical elements is located on or in the optically transmissive substrate. In this example, the pattern of optical elements is located at light emitting surface 186. In addition to the pattern of optical elements, the light emitting module may include other optical films, sheets, or substrates such as diffuser films, sheets, or substrates and lenticular prism films, sheets, or substrates. The optical substrate can have a multilayer structure that integrally incorporates the pattern of optical elements and other optical films, sheets, or substrates. The optical substrate can have a hollow structure or have an air gap. Alternatively, other optical films, sheets or substrates can be positioned over the assembly of light emitting modules. In addition, a reflector can be placed at the backside surface 189 of optically transmissive substrate 182.

The LEDs may be bonded or otherwise permanently attached to the light input surface 188 such that air gaps are substantially eliminated between the LED light emitting surfaces and the light input surfaces 188. Furthermore, it is possible to provide an antireflection coating at the light input surface 188 to enhance light input of a preferred wavelength range. Yet furthermore, it is possible to provide a microlens array at the light input surface to redirect the light in preferred directions. Upon entering the optically transmissive substrate via the light input surface 188, light travels through the transition region 187 and then reaches the light emitting surface 186. A pattern of individual optical elements may be formed on or in the light emitting surface 186 or backside surface 189. It is possible to provide a variation in the refractive index in the transition region 187 to redirect the light in particular directions. In this example, the optically transmissive substrate 188 has a tapered profile with the thickness decreasing at increasing distances from the LEDs. It is also possible to have a transmissive substrate of substantially constant thickness. The substrate may have depressions, slits, holes, or cavities wherein the LEDs may be placed. While LEDs are preferably used as the light source because of their commercial availability, faster response time, and long lifetime, organic light emitting diodes (OLEDs) may also be usable, particularly as OLED technologies mature. Furthermore, fluorescent lamps such as hot cathode fluorescent lamps (HCFLs), cold cathode fluorescent lamps (CCFLs), and external electrode fluorescent lamps (EEFLs) may also be used as the light source.

Figure 67A:
FIGS. 67A and 67B are graphs of the luminance profile along line A-A' of the light emitting assembly in FIG. 67.
Figure 67B:
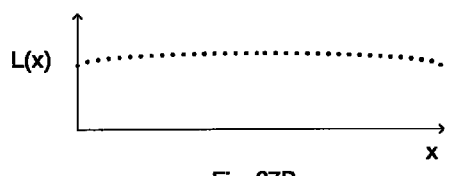

The luminance of the light emitting assembly 180 is measured along a virtual line A-A' that is located above the light emitting assembly, as shown in FIG. 67. FIG. 67A shows a graph of the luminance L(x) along the line A-A' in a Case 1 where the luminance along A-A' is observed to be substantially uniform. The luminance is measured when all of the LEDs of the light emitting assembly are in the steady-state ON state. The LEDs are illuminated with prescribed electrical inputs (e.g. voltage, current) and these inputs may vary among LEDs. The variation in electrical inputs among LEDs compensates for differences in optical outputs. The prescribed electrical input values may be stored in a look-up table (LUT) and individual values therein may be updated from time to time to compensate for differential aging. FIG. 67B shows a graph of the luminance L(x) along the line A-A' in a Case 2, where the luminance is within a prescribed range of a mean luminance value and the luminance varies gradually from the first end point A at one end of the light emitting assembly to the second end point A' at the opposite end of the light emitting assembly. Case 2 is useful when it is desired to produce LCD TVs that are slightly brighter near the middle of the display to make the appearance more pleasing to some viewers. Luminance characterization should be carried out for a plurality of virtual lines crossing the light emitting assembly in the x- and y-directions.

In prior art light emitting assemblies where the luminance cannot be made to be as uniform as desired, it is possible to compensate for the non-uniformity. This compensation can be done by characterizing the luminance profile of the light emitting assembly and storing the relevant data in a look-up table (LUT). The incoming video signals are then multiplied by correction factors k that depends on the luminance profile data.

Figure 69:
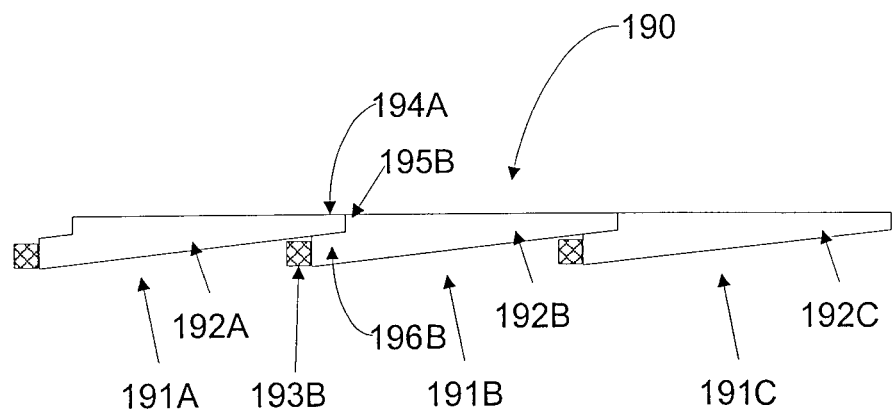
FIG. 69 is a schematic cross sectional view of a portion of a light emitting assembly in accordance with the present invention.

FIG. 69 is a schematic cross sectional view of a light emitting assembly 190 comprising light emitting modules 191A, 191B, and 191C. Each light emitting module is illuminated by at least one LED. The right edge region 194A of the left optical substrate 192A extends over LED 193B and transition region 196B of the adjacent optical substrate 192B. The patterns of optical elements on or in the optical substrates are configured so that discontinuities are minimized between right-edge region 194A and left-edge region 195B. Furthermore, this arrangement method places the LED under the thinner region of an adjacent optically transmissive substrate and helps to minimize the overall thickness of the light emitting assembly.

Figure 73:
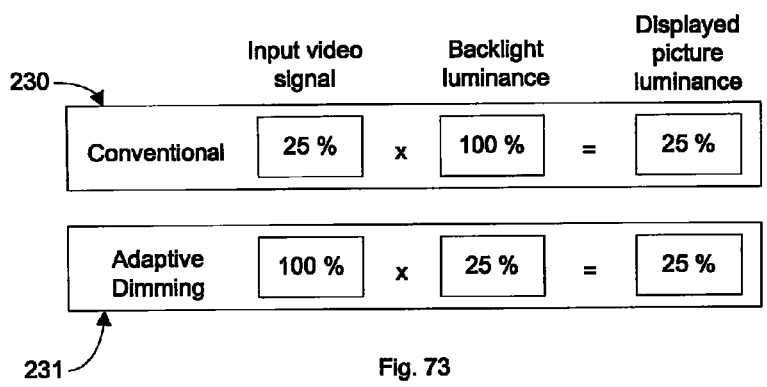
FIG. 73 is a schematic diagram comparing the concept of adaptive dimming to a conventional backlighting technology.

The arrangement of light emitting modules 191A, 191B, and 191C into an array to form a light emitting assembly 190 enables certain dynamic backlight techniques where localized, real-time control of backlight luminance, in response to incoming video signal data, is required. As an example, consider the concept of adaptive backlight dimming as shown in FIG. 73. In the conventional technique 230, the backlight luminance is maintained at a prescribed value while the input signal to the liquid crystal is modulated. With the adaptive dimming technique 231, when the video signal is low-luminance, the input signal to the liquid crystal is increased and the backlight luminance is decreased to give a displayed picture luminance that is substantially identical to that of the conventional technique. Adaptive dimming can be effective for reducing the backlight's electrical power consumption, improving the black level, and increasing the number of gray levels for low luminance images, thereby improving the bit depth beyond the nominal bit depth of the LCD.

Figure 74:
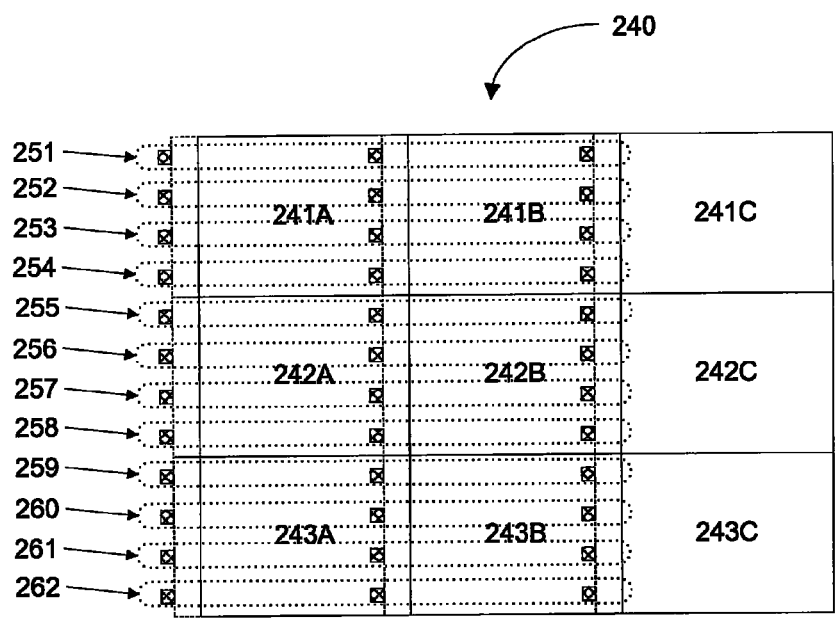
FIG. 74 is a schematic top plan view of a light emitting assembly in accordance with the present invention, additionally illustrating rows of LEDs.

Adaptive dimming can be implemented in zero-, one- and two-dimensional (0D, 1D, and 2D) configurations. 0D-dimming means that the entire backlight is uniformly dimmed. 1D-dimming (line dimming) is suitable for CCFLs, HCFLs, and EEFLs. One-dimensional dimming can also be realized using LEDs by dimming one row of LEDs. This concept can be understood with the aid of FIG. 74 which is a schematic plan view of a light emitting assembly 240. Light emitting assembly 240 includes three rows of three light emitting modules. For example, the top row of light emitting modules has light emitting modules 241A, 241B, and 241C. There are three LEDs associated with each light emitting module. There are twelve rows of LEDs (rows 251~261). One-dimensional dimming is possible when each row of LEDs can be addressed independently of other rows of LEDs. Furthermore, two-dimensional dimming is possible when each of the three LEDs in each row can be addressed independently of the other LEDs in that row. Two-dimensional dimming is suitable for LEDs and OLEDs.

Adaptive backlight boosting is another technique that can be implemented in 0-D, 1-D, and 2-D. In adaptive backlight boosting, backlight luminance is increased such that the displayed image luminance is also increased. Adaptive backlight boosting must be implemented in combination with adaptive backlight dimming because it requires a margin (e.g. electrical power and systems temperature) created by dimming. The perceived contrast and luminance can be increased. For more information on adaptive dimming and boosting, refer to: P. de Greef, et al., "Adaptive scanning, 1-D dimming, and boosting backlight for LCD-TV systems," Journal of the SID, volume 14, number 12, pp. 1103-1110 (2006) and T. Shiga, et al., "Power saving and enhancement of gray-scale capability of LCD TVs with an adaptive dimming technique," Journal of the SID, volume 16, number 2, pp. 311-316 (2008).

Because of the slow response of nematic liquid crystals to applied driving voltages, moving objects appear to have blurred edges. Impulsive driving, which can be realized with scanning backlights, can improve the image quality. Backlight scanning is synchronized to the address scanning of the liquid crystal panel. The pixels are illuminated by the backlight when the liquid crystal molecules have reached the prescribed transmission level. However, impulsive driving has the disadvantage that image flicker becomes visible for bright images. In order to reduce the image flicker, a second light pulse per address can be added, resulting in 100 (PAL system) or 120 (NTSC system) light pulses per second. In this case image flicker is not perceived because the human eye functions as a temporal low-pass filter. However, dual edges can become visible for moving images in a dual-pulse drive scheme.

Adaptive dual pulse driving has been developed to balance the need to reduce image flicker in bright images and to reduce dual edges in moving images. Adaptive dual pulse can be implemented in 0-D, 1-D, and 2-D. As in adaptive dimming and boosting, 2-D adaptive dual pulse can be implemented with an array of individually controllable LEDs or individually controllable groups of LEDs. For bright images with little motion where flicker reduction is important, the backlight is driven in dual pulse drive. For moving images where the scene is not bright, dual edge reduction is important and the backlight is driven in single pulse mode. Transitions between the single pulse and dual pulse modes can be implemented by gradually changing the phase, the pulse-width, or the luminance of the second pulse relative to the first pulse. Furthermore, in scenes including some motion and some brightness, an interpolation of the single pulse and dual pulse modes is used. Two-dimensional adaptive dual pulse is useful because the interpolation between single pulse and dual pulse modes can be optimized for each independently controllable light emitting region. For more information on adaptive pulse driving, refer to P. de Greef, et al., "Adaptive scanning, 1-D dimming, and boosting backlight for LCD-TV systems," Journal of the SID, volume 14, number 12, pp. 1103-1110 (2006).

Figure 70:
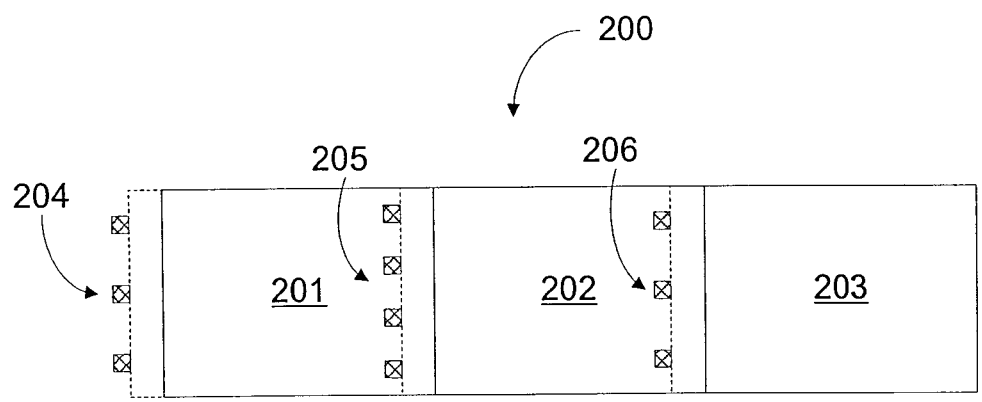
FIG. 70 is a schematic top plan view of a portion of a light emitting assembly in accordance with the present invention.
Figure 71:
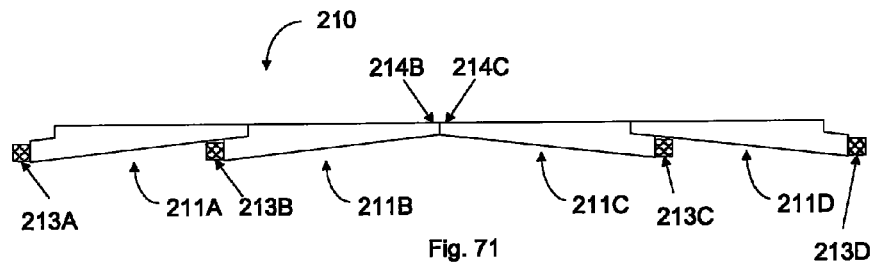
FIG. 71 is a schematic cross sectional side view of a portion of a light emitting assembly in accordance with the present invention, having LEDs emitting light in opposite directions.

FIG. 70 is a top schematic view of a light emitting assembly 200 comprising light emitting modules 201, 202, and 203. Light emitting modules 201 and 203 are each illuminated by three LEDs (204 and 206) but light emitting module 202 is illuminated by four LEDs (205). It is not necessary that each light emitting module be illuminated by the same number of LEDs. FIGS. 69 and 70 show embodiments in which LEDs are arranged along the left side of each light emitting module such that light is emitted to the right. It is not necessary to configure all of the LEDs to emit in the same general direction. For example, as shown in FIG. 71, it is possible to configure some of the LEDs to emit light in opposite directions. FIG. 71 shows a light emitting assembly 210 comprising light emitting modules 211A, 211B, 211C, and 211D. The LEDs (213A and 213B) associated with light emitting modules 211A and 211B emit light to the right and the LEDs (213C and 213D) associated with light emitting modules 211C and 211D emit light to the left. In this arrangement, boundary regions 214B (of module 211B) and 214C (of module 211C) must be configured such that discontinuities in the pattern of optical elements are minimized. It is also possible to position the LEDs along the top or bottom edges of the modules. Yet furthermore, it is possible to orient some of the LEDs at different angles than some other LEDs to direct light in different directions. It is also possible to use optical substrate shapes other than rectangles such as triangles.

FIG. 68A illustrates an embodiment where LEDs 183, 184, and 185 are white LEDs. In a conventional color LCD, white light illuminates a color filter array on the LCD panel substrate. There has been increasing interest in developing color sequential LCDs wherein a liquid crystal panel that does not have a color filter array is illuminated sequentially by each color component (e.g. red, green, and blue). The advantages of a color sequential LCD include: higher optical efficiency, higher aperture ratio, and higher resolution. However, this technology requires liquid crystal switching faster than can generally be achieved with nematic liquid crystals with overdriving and the response time of CCFLs is too long. The development of LED backlights and the faster-switching optically compensated bend (OCB) mode are key to the commercial development of color sequential LCDs. For more information on color sequential LCDs and the OCB mode, refer to T. Ishinabe, et al., "High-performance OCB-mode field-sequential-color LCD," Journal of the SID, volume 16, number 2, pp. 251-256 (2008).

Figure 75:
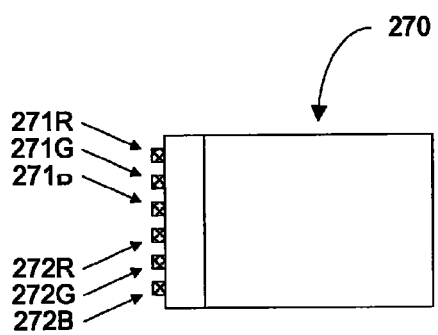
FIG. 75 is a schematic top plan view of a light emitting module in accordance with the present invention, having red, green, and blue LEDs.

FIG. 75 is a schematic plan view of a light emitting module 270 in accordance with another embodiment of the present invention, wherein the optical substrate is illuminated by a plurality of LEDs as follows: red LEDs (271R and 272R), green LEDs (271G and 272G), and blue LEDs (271B and 272B). The light emitting modules can be assembled into a light emitting assembly of the kind schematically shown in FIG. 67. The luminance profile can be characterized in a manner similar to white light as explained above with reference to FIGS. 67A and 67B. In other words, when all of the LEDs are illuminated with the prescribed electrical inputs, the luminance profiles should be substantially uniform as shown in FIG. 67A or the luminance should be within a prescribed range of a mean luminance value and the luminance should vary gradually from the first end point A at one end of the light emitting assembly to the second end point A' at the opposite end of the light emitting assembly, as shown in FIG. 67B. Similar luminance profiles should be obtained when just the blue LEDs, the green LEDs, or the red LEDs are illuminated. Furthermore, when all of the LEDs are illuminated, the visible light should appear to be white everywhere above the light emitting assembly. In order to make a color-sequential LCD, the LEDs of each color need to be independently addressable.

Adaptive dimming and boosting can be implemented for each individual color component (e.g. red, green, and blue) in backlight assemblies that have individually addressable light sources of the component colors. As described above, backlight assemblies with individually addressable component colors are used in color sequential LCDs. Adaptive dimming and boosting can also be implemented in backlight assemblies that have a combination of component color light sources and white light sources (e.g. red, green, blue, and white). Adaptive dimming and boosting for individual component colors can be implemented in 0-D, 1-D, or 2-D.

Figure 72:
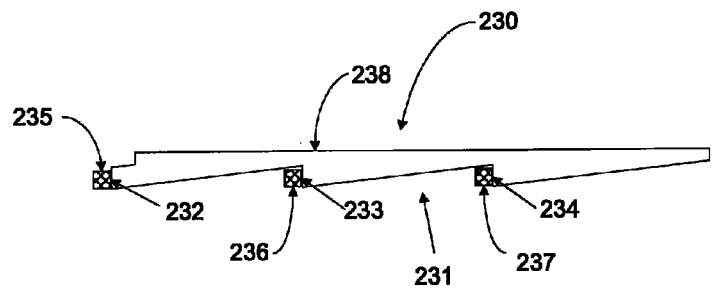
FIG. 72 is a schematic cross sectional side view of a portion of a light emitting assembly in accordance with the present invention, having a smaller number of assembly steps.

FIG. 72 is a schematic cross sectional view of an optical assembly 230 in accordance with another embodiment of the present invention. Note that the optical substrate 231 has a repetitive tapered cross sectional profile or a saw tooth blade cross sectional profile. Optical substrate 231 may be fabricated by a process comprising the following steps, as schematically illustrated in FIG. 66. First, a master having a pattern of optical elements is prepared, and then a $1^{st}$ generation electroform copy (175) of the master, having an inverse pattern, is prepared. When an optical substrate is prepared using the $1^{st}$ generation electroform copy (175) as a portion of the mold, the resulting optical substrate can be of the kind shown in FIG. 69. However, in this example, $2^{nd}$ generation electroform copies (176), having the original pattern, are formed and tiled to form a tile assembly (177). A $1^{st}$ generation electroform copy (178) of the tile assembly is then formed, having an inverse pattern of the assembly, and then an optical substrate 231 of FIG. 72 is formed using the $1^{st}$ generation electroform copy (178) of the tile assembly as a portion of the mold. Furthermore, optical assembly 230 is fabricated by attaching LEDs 235, 236, and 237 to the respective light input surfaces 232, 233, and 234. An advantage of this approach is that a large amount of mechanical assembly work in assembling the optical substrates is eliminated.

Figure 76:
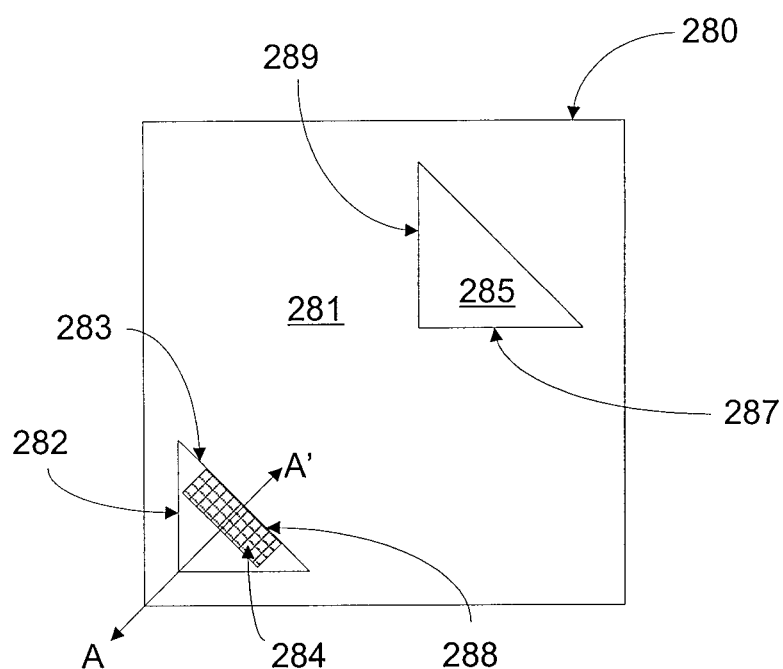
FIG. 76 is a schematic top plan view of a light emitting module in accordance with the present invention, including slots, cavities, or holes in the optically transmissive substrate.
Figure 76A:
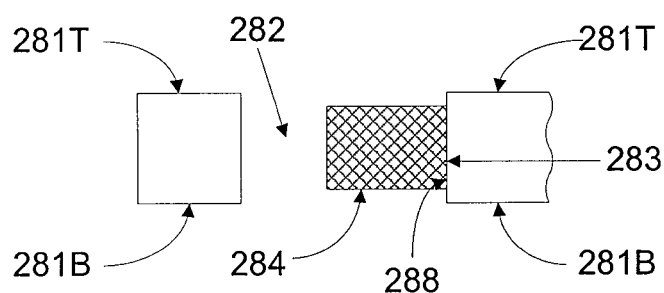
FIG. 76A is a schematic cross sectional view along line A-A' of FIG. 76.

FIG. 76 is a schematic top plan view of a light emitting module 280, which includes an optically transmissive substrate 281 and a light emitting diode (LED) 284. FIG. 76A is a schematic cross sectional view along line A-A' of FIG. 76. Optically transmissive substrate 281 is substantially flat, with two major planar surfaces 281T and 281B that are substantially parallel to each other, except at slots, cavities, or holes in the substrate. Optically transmissive substrate 281 has two slots, cavities, or holes 282 and 285 which extend completely between the two major planar surfaces 281T and 281B. LED 284 is positioned in slot, cavity, or hole 282, and has a light emitting surface 288 which is substantially parallel to, and abuts against, the optically transmissive substrate's light input surface 283. LED 284 may be adhered to light input surface 283 by an adhesive. Electrical connections may be made to LED 284 by a circuit board (not shown) which may be located, for example, underneath major planar surface 281B. In this embodiment, the other slot, cavity, or hole 285 does not contain any light sources. In another embodiment, another LED may be positioned in slot, cavity, or hole 285. Slot, cavity, or hole 285 includes non-diffusive refractive surfaces 287 and 289 that function to redirect light from LED 284 in desired directions. This feature is useful in applications where illumination is desired in selected areas. For example, membrane switches are widely used to make keyboards and keypads for electronics apparatuses. In keyboards and keypads there is an overlay of alphanumeric or other characters that is illuminated by a light emitting assembly. Electronic apparatuses may also have illuminated areas that are not membrane switches. For example, a notebook PC may have illuminated indicia relating to power status and connection status to the wireless network. In some cases, one light emitting assembly may be provided for the membrane switch area (keyboard or keypad) and the non-membrane-switch illuminated area. Therefore, the light emitting assemblies of the present invention can be used to illuminate keyboards, keypads, membrane switches, and other illuminated indicia.

Additionally, there are automotive applications where illumination of selected areas is needed. For example, a light emitting assembly may be used to indicate different gear shift selector positions (e.g. P, R, N, D, L) or to illuminate an instrument panel. In these cases, there are graphical and alphanumeric overlays that are illuminated by the light emitting assembly.

FIG. 77 is a schematic bottom plan view of a light emitting module 290 which includes an optically transmissive substrate 291. Highlighted in optically transmissive substrate 291 is a selected portion 301 that has a length and width that is relatively small compared to the length and width of optically transmissive substrate 291. Substrate portion 301 is shown in greater detail in FIG. 78.

FIG. 78 is a schematic bottom plan view of optically transmissive substrate portion 301. Substrate portion 301 includes a depression 302 in the substrate and a light emitting diode 304 positioned in the depression. FIG. 78A is a schematic cross sectional view along line A-A' of FIG. 78. The substrate has two major planar surfaces 301T and 301B that are substantially parallel to each other except at the depression. Depression 302 extends from major planar surface 301B partly towards major planar surface 301T. LED 304 has a light emitting surface 308 which is substantially parallel to the substrate's light input surface 303. Therefore, LED light emitting surface 308 and substrate light input surface 303 are substantially perpendicular to the two major planar surfaces 301T and 301B.

Other LED arrangements are also possible. FIG. 78B is a schematic cross sectional view of an optically transmissive substrate portion 311 in accordance with another embodiment. Substrate portion 311 has two major planar surfaces 311T and 311B and a depression 312 in the substrate with a prismatic light input surface 313. LED 314 is positioned such that its light emission surface 318 is parallel to the substrate's major planar surfaces 311T and 311B and aligned with prismatic surface 313. Furthermore, LED 314 is positioned such that a portion of its light output enters the right side of prismatic surface 313 and the remaining portion of the light output enters the left side of prismatic surface 313.

FIG. 79 is a schematic bottom plan view of an optically transmissive substrate portion 321 in accordance with another embodiment. FIG. 79A is a schematic cross sectional view along line A-A' of FIG. 79. Substrate portion 321 includes a projection 326 on major planar surface 321B which functions as a microlens. The substrate has two major planar surfaces 321T and 321B that are substantially parallel to each other except at the projection. Projection 326 includes a light input surface 323 which is perpendicular to the two major planar surfaces. LED 324 is positioned such that its light emitting surface 328 is parallel to and aligned with the substrate's light input surface 323.

FIG. 79B is a schematic cross sectional view of a substrate portion 331 in accordance with another embodiment. Substrate portion 331 includes a projection 336 on major planar surface 331B which functions as a microlens and an LED 334 that is positioned with its light emission surface 338 parallel to and aligned with the projection's light input surface 333. These features are substantially identical to those of FIG. 79A. In addition, there is a depression 332 in major planar surface 331T. Depression 332 functions to increase the amount of light that propagates in the substrate by total internal reflection.

FIG. 79C is a schematic cross sectional view of a substrate portion 341 in accordance with another embodiment. Substrate portion 341 includes a projection 346 on major planar surface 341B which functions as a microlens and an LED 344. Projection 346 is shaped such that its light input surface 343 is at an oblique angle relative to the major planar surfaces 341T and 341B. Furthermore, LED 344 is positioned such that its light emitting surface 348 is substantially parallel to and aligned with light input surface 343.

In addition to backlighting for liquid crystal displays, the light emitting assemblies of the present invention can be used in keyboards, keypads, and other membrane switch applications. Furthermore, the light emitting assemblies can be used in applications where graphical or character overlays are illuminated by the light emitting assemblies. Examples of this include: status indicia in computers and other electronics products, gear shift selection indication in automobiles, and instrument panel illumination in automobiles. The light emitting assemblies of the present invention can also be used for exterior lighting of automobiles, such as head lights, tail lights, brake lights, fog lights, and turn signals. Furthermore, the light emitting assemblies can be used for other general lighting applications, such as ceiling lights in houses and buildings and desk lights.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one embodiment, such feature may be combined with one or more other features of other embodiments as may be desired and advantageous for any given or particular application.

What is claimed is:

1. A method of displaying images in response to a video signal, comprising the steps of:
    providing a light emitting assembly including a plurality of optically transmissive substrates, films, or sheets, wherein each of the substrates, films, or sheets has at least one pattern of optical elements at the substrates, films, or sheets; and a plurality of light sources, each light source being configured to emit light into at least one area of the substrates, films, or sheets;
    configuring the light emitting assembly to emit light through the patterns of optical elements and to produce a predetermined luminance profile of the light emitting assembly;
    configuring a liquid crystal panel to be illuminated by the light emitting assembly;
    receiving an input video signal; and
    dimming or boosting at least one of the plurality of light sources in response to the input video signal while operating the liquid crystal panel as a light valve, wherein an end portion of at least one of the substrates, films, or sheets overlaps another end portion of an adjacent substrate, film, or sheet, the optical elements are substantially smaller than the length and width of the substrates, films, or sheets, and the optical elements of the respective patterns at the adjacent substrates, films, or sheets adjacent a seam between the overlapping end portions have shapes that substantially match one another to form a substantially seamless transition with minimal discontinuities in the optical element shapes at the seam to make the seam less visible.

2. The method of claim 1, wherein the light sources are light emitting diodes.

3. The method of claim 2, wherein the liquid crystal panel comprises a color filter array and the light sources are white light emitting diodes.

4. The method of claim 2, wherein a plurality of light emitting diodes belonging to a row of light emitting diodes are dimmed or boosted together.

5. The method of claim 4, wherein all of the light emitting diodes belonging to the row of light emitting diodes are dimmed or boosted together.

6. The method of claim 1, wherein each of the substrates, films, or sheets has multiple areas into which light is emitted.

7. The method of claim 1, wherein the input signal to the liquid crystal panel is increased and the luminance from the light emitting assembly is reduced in response to a low-luminance input video signal to give a predetermined displayed picture luminance.

8. The method of claim 1, wherein the dimming or boosting step is effective for reducing electrical power consumption of the light emitting assembly and improving black level.

9. The method of claim 1, wherein the light emitting assembly is configured to emit light through the at least one pattern of optical elements on or in each of the substrates, films or sheets and to produce a luminance profile that is within a prescribed range of a mean luminance value and the luminance varies gradually from a first end point at one end of the light emitting assembly to a second end point at an opposite end of the light emitting assembly when all light sources of the plurality of light sources are ON.

10. A method of displaying images in response to a video signal, comprising the steps of:
    providing a light emitting assembly including a plurality of optically transmissive substrates, films, or sheets, each of the substrates, films, or sheets having at least one pattern of optical elements at the substrates, films or sheets, the substrates, films or sheets having a plurality of light output areas, and a plurality of light sources, at least some of the light sources being configured to selectively emit light into different ones of the output areas of the substrates, films, or sheets;
    configuring the light emitting assembly to emit light through the pattern of optical elements and to produce a predetermined luminance profile of the light emitting assembly; configuring a liquid crystal panel to be illuminated by the light emitting assembly; receiving an input video signal; and
    dimming or boosting at least one of the plurality of light sources in response to the input video signal while operating the liquid crystal panel as a light valve, wherein an end portion of at least one of the substrates, films, or sheets overlaps another end portion of an adjacent substrate, film, or sheet, the optical elements are substantially smaller than the length and width of the substrates, films, or sheets, and the optical elements of the respective patterns at the adjacent substrates, films, or sheets adjacent a seam between the overlapping end portions have shapes that substantially match one another to form a substantially seamless transition with minimal discontinuities in the optical element shapes along the seam to make the seam less visible.

11. The method of claim 10, wherein the light sources are light emitting diodes.

12. The method of claim 11, wherein the liquid crystal panel comprises a color filter array and the light sources are white light emitting diodes.

13. The method of claim 11, wherein a plurality of light emitting diodes belonging to a row of light emitting diodes are dimmed or boosted together.

14. The method of claim 13, wherein all of the light emitting diodes belonging to the row of light emitting diodes are dimmed or boosted together.

15. The method of claim 1, wherein the optical elements of the respective patterns of the adjacent substrates, films, or sheets are substantially random except adjacent the seam between the overlying end portions where the optical element shapes substantially match one another.

16. The method of claim 10, wherein the optical elements of the respective patterns of the adjacent substrates, films, or sheets are substantially random except adjacent the seam between the overlying end portions wherein the optical element shapes substantially match one another.

* * * * *

UNITED STATES PATENT AND TRADEMARK OFFICE
CERTIFICATE OF CORRECTION

| | | |
|---|---|---|
| PATENT NO. | : 8,462,292 B2 | Page 1 of 1 |
| APPLICATION NO. | : 12/504236 | |
| DATED | : June 11, 2013 | |
| INVENTOR(S) | : Jeffery R. Parker, Timothy A. McCollum and Fumitomo Hide | |

It is certified that error appears in the above-identified patent and that said Letters Patent is hereby corrected as shown below:

Title Page, item (75) Inventors should read as follows:
        Jeffery R. Parker, Richfield, OH (US);
        Timothy A. McCollum, Thurmont, MD (US);
        Fumitomo Hide, San Jose, CA (US)

Signed and Sealed this
Third Day of September, 2013

Teresa Stanek Rea
*Acting Director of the United States Patent and Trademark Office*